US010664395B2

(12) United States Patent
Oh et al.

(10) Patent No.: US 10,664,395 B2
(45) Date of Patent: May 26, 2020

(54) MEMORY DEVICE INCLUDING PAGE BUFFERS

(71) Applicant: SK hynix Inc., Gyeonggi-do (KR)

(72) Inventors: Sung-Lae Oh, Chungcheongbuk-do (KR); Dong-Hyuk Kim, Seoul (KR); Soo-Nam Jung, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/198,413

(22) Filed: Nov. 21, 2018

(65) Prior Publication Data

US 2020/0004680 A1 Jan. 2, 2020

(30) Foreign Application Priority Data

Jun. 29, 2018 (KR) ........................ 10-2018-0075145

(51) Int. Cl.
*G11C 16/04* (2006.01)
*G06F 12/0806* (2016.01)

(52) U.S. Cl.
CPC .. *G06F 12/0806* (2013.01); *G06F 2212/1008* (2013.01); *G06F 2212/608* (2013.01)

(58) Field of Classification Search
CPC .................................................. G06F 12/0806
USPC .................................................. 365/189.05
See application file for complete search history.

(56) References Cited

U.S. PATENT DOCUMENTS 8,228,744 B2 7/2012 Yoshihara et al.
9,460,793 B1 * 10/2016 Oh ........................ G11C 16/08

FOREIGN PATENT DOCUMENTS

KR 1020160146287 12/2016
KR 1020170130969 11/2017

* cited by examiner

*Primary Examiner* — Xiaochun L Chen
(74) *Attorney, Agent, or Firm* — IP & T Group LLP

(57) ABSTRACT

A memory device includes a plurality of bit lines; a page buffer circuit including a plurality of page buffers which are electrically coupled to the plurality of bit lines; and a cache circuit including a plurality of caches which are electrically coupled to the plurality of page buffers, wherein a number of stages of the page buffer circuit is less than a number of stages of the cache circuit.

19 Claims, 39 Drawing Sheets

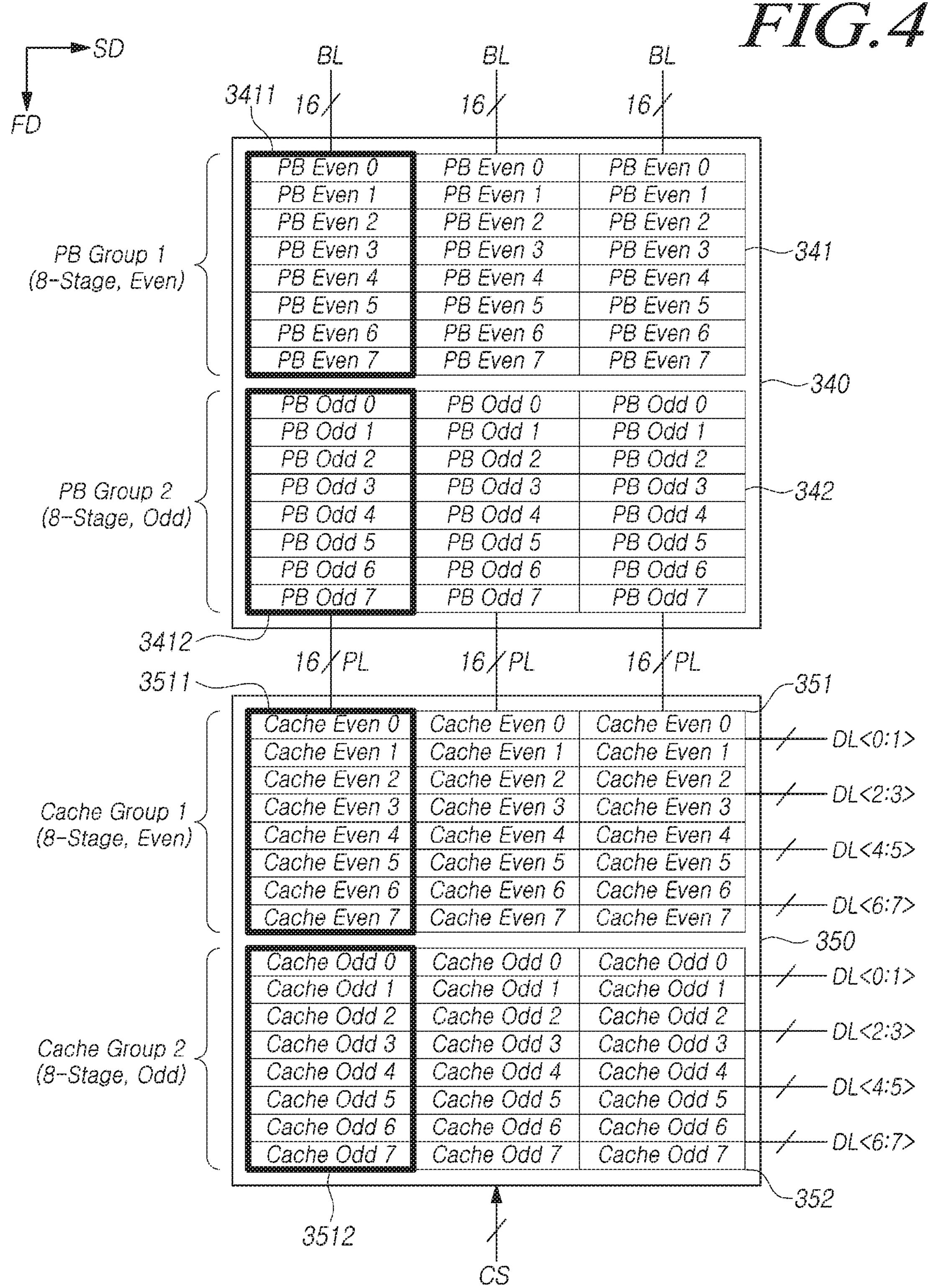
FIG.4
SD
FD
BL
BL
BL
16
16
16
3411
PB Group 1
(8-Stage, Even)
PB Even 0
PB Even 1
PB Even 2
PB Even 3
PB Even 4
PB Even 5
PB Even 6
PB Even 7
341
340
PB Group 2
(8-Stage, Odd)
PB Odd 0
PB Odd 1
PB Odd 2
PB Odd 3
PB Odd 4
PB Odd 5
PB Odd 6
PB Odd 7
342
3412
16 PL
16 PL
16 PL
3511
351
Cache Group 1
(8-Stage, Even)
Cache Even 0
Cache Even 1
Cache Even 2
Cache Even 3
Cache Even 4
Cache Even 5
Cache Even 6
Cache Even 7
DL<0:1>
DL<2:3>
DL<4:5>
DL<6:7>
350
Cache Group 2
(8-Stage, Odd)
Cache Odd 0
Cache Odd 1
Cache Odd 2
Cache Odd 3
Cache Odd 4
Cache Odd 5
Cache Odd 6
Cache Odd 7
DL<0:1>
DL<2:3>
DL<4:5>
DL<6:7>
352
3512
CS SD
FD
PB Group 1
(5-Stage, Even)
PB Group 2
(5-Stage, Odd)
Cache Group 1
(5-Stage, Even)
Cache Group 2
(5-Stage, Odd)
BL
10
PL
DL<0:7>
540
541
542
550
551
552

SD
FD
740
741
742
750
751
752
BL
10
PL
DL<0:1>
DL<2:3>
DL<4:5>
DL<6:7>
PB Group 1 (5-Stage, Even)
PB Group 2 (5-Stage, Odd)
Cache Group 1 (8-Stage, Even)
Cache Group 2 (8-Stage, Odd)

SD
FD
PB Group 1
(5-Stage, DL<0:3>)
PB Group 2
(5-Stage, DL<4:7>)
Cache Group 1
(8-Stage, DL<0:3>)
Cache Group 2
(8-Stage, DL<4:7>)
1340
1341
1342
1350
1351
1352
DL<0>
DL<1>
DL<2>
DL<3>
DL<4>
DL<5>
DL<6>
DL<7>
BL
PL
10

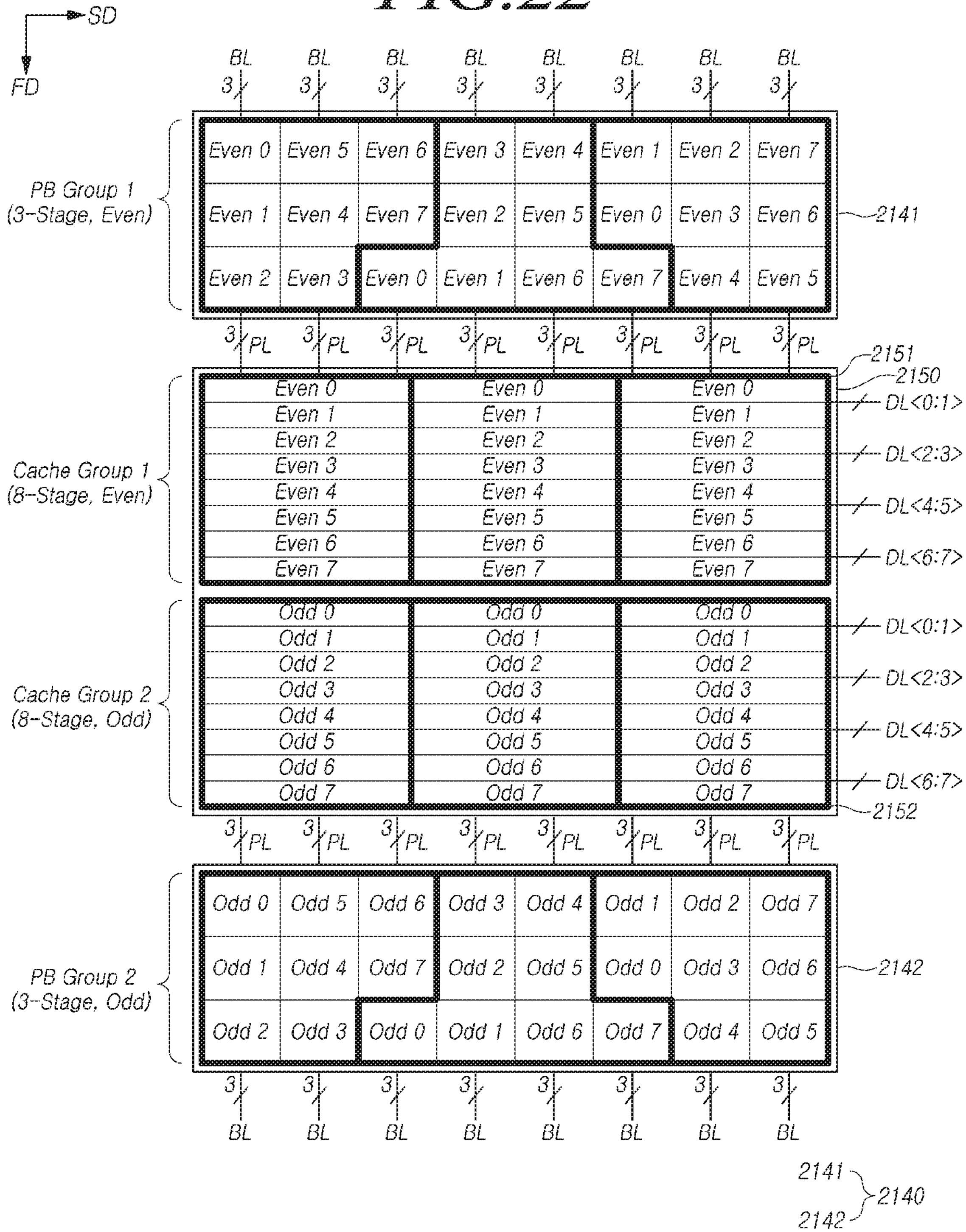
FIG.22
SD
FD
BL
3
PB Group 1
(3-Stage, Even)
Even 0 Even 5 Even 6 Even 3 Even 4 Even 1 Even 2 Even 7
Even 1 Even 4 Even 7 Even 2 Even 5 Even 0 Even 3 Even 6
Even 2 Even 3 Even 0 Even 1 Even 6 Even 7 Even 4 Even 5
2141
PL
2151
2150
Cache Group 1
(8-Stage, Even)
Even 0
Even 1
Even 2
Even 3
Even 4
Even 5
Even 6
Even 7
DL<0:1>
DL<2:3>
DL<4:5>
DL<6:7>
Cache Group 2
(8-Stage, Odd)
Odd 0
Odd 1
Odd 2
Odd 3
Odd 4
Odd 5
Odd 6
Odd 7
2152
PB Group 2
(3-Stage, Odd)
Odd 0 Odd 5 Odd 6 Odd 3 Odd 4 Odd 1 Odd 2 Odd 7
Odd 1 Odd 4 Odd 7 Odd 2 Odd 5 Odd 0 Odd 3 Odd 6
Odd 2 Odd 3 Odd 0 Odd 1 Odd 6 Odd 7 Odd 4 Odd 5
2142
2141
2142
2140

2510
2541
2542
BL<70:79>
BL<60:69>
BL<50:59>
BL<40:49>
BL<30:39>
BL<20:29>
BL<10:19>
BL<0:9>
SD
FD
PB Group 1 (5-Stage)
PB Group 2 (5-Stage)

2541
2542
2510
BL<0:79>
PB Group 1 (5-Stage)
PB Group 2 (5-Stage)

PB Group 1 (5-Stage)

| | | | | | | | |
|---|---|---|---|---|---|---|---|
| Even | Even | Even | Even | Even | Even | Even | Even |
| Odd | Odd | Odd | Odd | Odd | Odd | Odd | Odd |
| Even | Even | Even | Even | Even | Even | Even | Even |
| Odd | Odd | Odd | Odd | Odd | Odd | Odd | Odd |
| Even | **Odd** | Even | **Odd** | Even | **Odd** | Even | **Odd** |

PB Group 1 (5-Stage)

| | | | | | | | |
|---|---|---|---|---|---|---|---|
| Even (BL <0>) | Even | Even | Even | Even | Even | Even | Even |
| Odd (BL <1>) | Odd | Odd | Odd | Odd | Odd | Odd | Odd |
| Even (BL <2>) | Even (BL <7>) | Even | Even | Even | Even | Even | Even |
| Odd (BL <3>) | Odd (BL <6>) | Odd | Odd | Odd | Odd | Odd | Odd |
| Even (BL <4>) | Odd (BL <5>) | Even | Odd | Even | Odd | Even | Odd |

| Even (BL <0>) | Odd | Even | Odd | Even | Odd | Even | Odd |
|---|---|---|---|---|---|---|---|
| Odd (BL <1>) | Even | Odd | Even | Odd | Even | Odd | Even |
| Even (BL <2>) | Odd (BL <7>) | Even | Odd | Even | Odd | Even | Odd |
| Odd (BL <3>) | Even (BL <6>) | Odd | Even | Odd | Even | Odd | Even |
| Even (BL <4>) | Odd (BL <5>) | Even | Odd | Even | Odd | Even | Odd |

PB Group 1 (5-Stage)

MEMORY DEVICE INCLUDING PAGE BUFFERS

CROSS-REFERENCE TO RELATED APPLICATION

The present application claims priority under 35 U.S.C. 119(a) to Korean Patent Application No. 10-2018-0075145, filed on Jun. 29, 2018, which is incorporated herein by reference in its entirety.

BACKGROUND

1. Technical Field

Various embodiments generally relate to a memory device, and, more particularly, to a memory device including page buffers.

2. Related Art

In a volatile memory device, write and read speeds are high, but stored data may be lost if power supply is interrupted. In a nonvolatile memory device, write and read speeds are relatively low, but stored data may be retained even though power supply is interrupted. Therefore, in order to retain stored data regardless of the power supply state, a nonvolatile memory device may be used. Nonvolatile memory devices include a read only memory (ROM), a mask ROM (MROM), a programmable ROM (PROM), an erasable programmable ROM (EPROM), an electrically erasable programmable ROM (EEPROM), a flash memory, a phase change random access memory (PRAM), a magnetic RAM (MRAM), a resistive RAM (RRAM), and a ferroelectric RAM (FRAM). Flash memories may be classified into a NOR type and a NAND type.

Among nonvolatile memory devices, a NAND flash memory device is widely used as a data storage device. The NAND flash memory device may perform operations necessary to read and output the data stored in memory cells, by using a plurality of page buffers.

SUMMARY

In an embodiment, a memory device may include: a plurality of bit lines; a page buffer circuit including a plurality of page buffers which are electrically coupled to the plurality of bit lines; and a cache circuit including a plurality of caches which are electrically coupled to the plurality of page buffers, wherein a number of stages of the page buffer circuit is less than a number of stages of the cache circuit.

In an embodiment, a memory device may include: a plurality of bit lines; and a page buffer circuit in which a plurality of page buffers electrically coupled to the plurality of bit lines are arranged in a matrix, wherein the plurality of page buffers are grouped into a plurality of page buffer input/output units in correspondence to a data input/output processing unit, and wherein page buffers of one page buffer input/output unit are disposed over at least two columns.

In an embodiment, a memory device may include: a plurality of bit lines; and a page buffer circuit including a plurality of page buffers which are electrically coupled to the plurality of bit lines, wherein the page buffer circuit is divided into a first page buffer group and a second page buffer group depending on corresponding data input/output pins, and wherein each of the first page buffer group and the second page buffer group has an odd number of stages.

In an embodiment, a memory device may include: first and second arrays of page buffers coupled to bit lines; and first and second arrays of caches electrically coupled to the first and second arrays of page buffers, respectively, and electrically coupled to first and second data pin groups, respectively, wherein a row size of each array of page buffers is smaller than a row size of each array of caches.

BRIEF DESCRIPTION OF THE DRAWINGS

FIGS. 4 and 6 are diagrams illustrating layouts of the page buffers and the caches of FIGS. 3 and 5.

FIGS. 8, 10, 12, 14, 16, 18, 20, 22 and 24 are diagrams illustrating exemplary layouts of the page buffers and the caches of FIGS. 7, 9, 11, 13, 15, 17, 19, 21 and 23.

FIG. 33 is a diagram illustrating an example of the layout of page buffers in a page buffer group.

FIGS. 34A and 34B are diagrams to assist in the explanation of the influence of a defective particle for the layout of page buffers shown in FIG. 33.

FIGS. 35A and 35B are diagrams illustrating an example of the layout of page buffers in a page buffer group.

DETAILED DESCRIPTION

Figure 1:
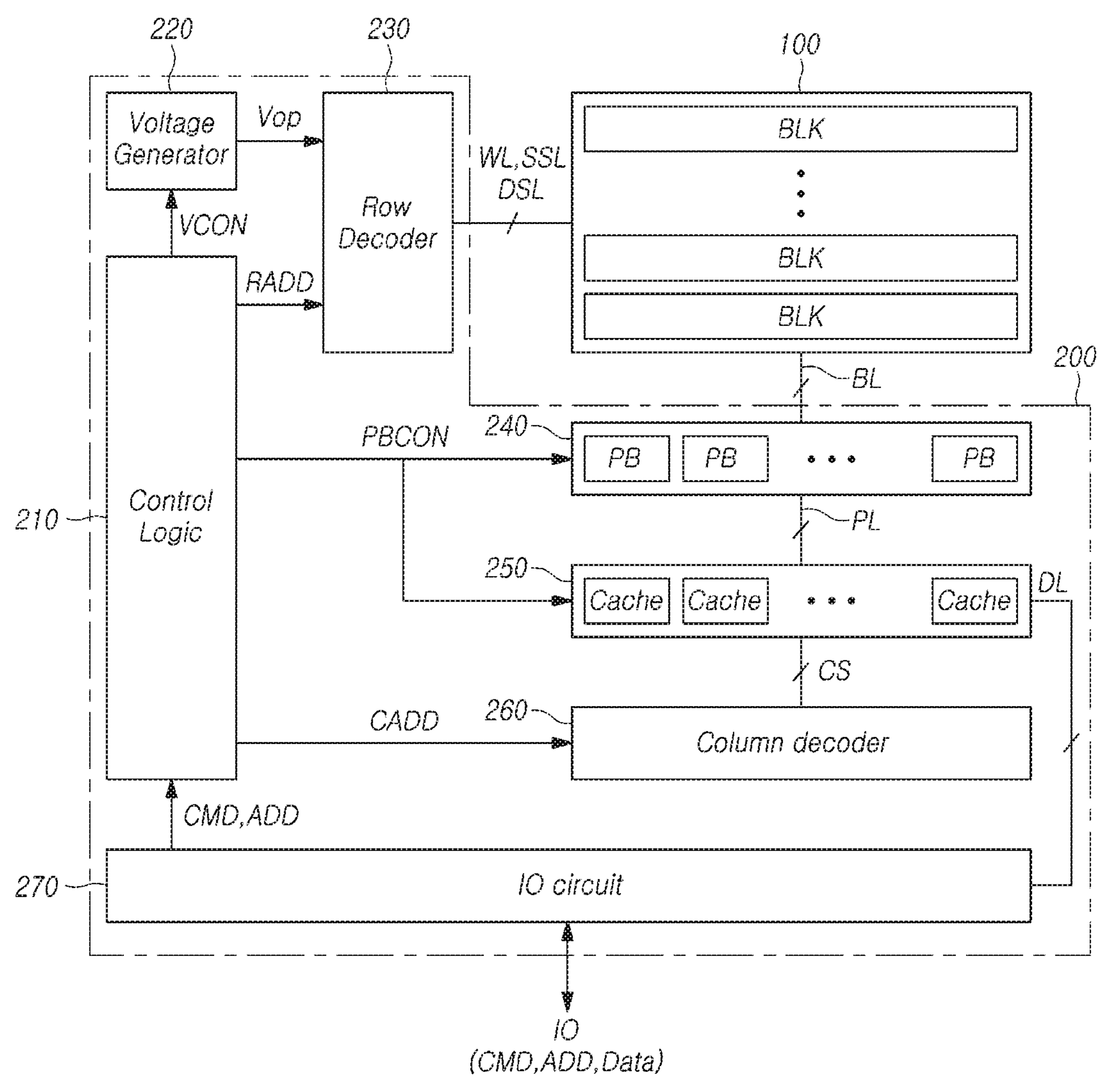
FIG. 1 is a block diagram illustrating f a memory device in accordance with an embodiment.

Aspects of the present disclosure will be described in detail with reference to the accompanying drawings. In the following description, the same elements, throughout the drawings, will be designated by the same reference numerals. Further, detailed description of known functions and configurations incorporated herein may be omitted so as not to make the subject matter of the present disclosure unclear. Also, throughout the specification, reference to "an embodiment" or the like is not necessarily to only one embodiment, and different references to any such phrase are not necessarily to the same embodiment(s).

Also, in describing the components of the present disclosure, there may be terms used like first, second, A, B, (a), and (b). These are solely for the purpose of differentiating one component from the other but not to imply or suggest substance, order or sequence of the components. If a component is described as "connected," "coupled" or "linked" to another component, such components may be directly or indirectly "connected," "coupled" or "linked."

FIG. 1 is a block diagram illustrating a representation of an example of a memory device in accordance with an embodiment.

Referring to FIG. 1, the memory device may include a memory cell array 100 and a peripheral circuit 200. The peripheral circuit 200 may include a control logic 210, a voltage generator 220, a row decoder 230, a page buffer circuit 240, a cache circuit 250, a column decoder 260 and an input/output circuit 270.

The memory cell array 100 may include a plurality of memory cells. The memory cell array 100 may be configured as a three-dimensional memory array in which the memory cells are stacked in a direction perpendicular to a substrate, but the present disclosure is not limited thereto.

The memory cell array 100 may be coupled to the row decoder 230 through word lines WL and select lines DSL and SSL. The select lines DSL and SSL may include a drain select line DSL and a source select line SSL. The memory cell array 100 may be coupled to the page buffer circuit 240 through bit lines BL. The memory cell array 100 may store the data inputted through the page buffer circuit 240, in a program operation, and may transmit stored data to the page buffer circuit 240, in a read operation.

The memory cell array 100 may include a plurality of memory blocks BLK. Memory block BLK may be an erase unit. Word lines WL, select lines DSL and SSL and bit lines BL may be coupled to the respective memory blocks BLK. Word lines WL and select lines DSL and SSL may be coupled to each of the memory blocks BLK. Bit lines BL may be coupled in common to a plurality of memory blocks BLK. Description of an exemplary one of the memory blocks BLK is given below with reference to FIG. 2.

The control logic 210 may be configured to output a voltage control signal VCON for generating voltages necessary for the operation of the memory device, in response to a command CMD inputted through the input/output circuit 270. The control logic 210 may be configured to output a page buffer control signal PBCON for controlling the page buffer circuit 240 and the cache circuit 250. The control logic 210 may be configured to output a row address signal RADD and a column address signal CADD in response to an address signal ADD inputted through the input/output circuit 270.

The voltage generator 220 may be configured to generate various operating voltages Vop to be used in a program, read or erase operation, in response to the voltage control signal VCON of the control logic 210. For example, the voltage generator 220 may be configured to generate program voltages, pass voltages, read voltages and erase voltages of various levels, in response to the voltage control signal VCON.

The row decoder 230 may be configured to select one among the memory blocks BLK of the memory cell array 100, in response to the row address signal RADD from the control logic 210. The row decoder 230 may be configured to transfer the operating voltages Vop from the voltage generator 220, to the word lines WL and the select lines DSL and SSL coupled to a selected memory block BLK.

The page buffer circuit 240 may be coupled to the memory cell array 100 through bit lines BL. The page buffer circuit 240 may include a plurality of page buffers PB which are coupled to the bit lines BL, respectively. The page buffers PB may exchange data with the memory cell array 100 through the bit lines BL.

The cache circuit 250 may be coupled with the page buffer circuit 240 through page lines PL. The cache circuit 250 may exchange data with the page buffer circuit 240 through the page lines PL. The cache circuit 250 may exchange data with the input/output circuit 270 through data lines DL. The cache circuit 250 may be configured to temporarily store the data received from the memory cell array 100 or data to be provided to the memory cell array 100. The cache circuit 250 may be configured to store the data received from the respective page buffers PB and transfer some of the stored data to the input/output circuit 270 through the data lines DL in response to a column select signal CS inputted from the column decoder 260. The cache circuit 250 may be configured to exchange data with the page buffers PB or the input/output circuit 270 in response to the page buffer control signal PBCON received from the control logic 210.

While it is illustrated in FIG. 1 that the cache circuit 250 is configured separately from the page buffer circuit 240, the cache circuit 250 and the page buffer circuit 240 may be combined in a single component. In this specification, the cache circuit 250 is illustrated as a separate block from the page buffer circuit 240 for clarity.

The column decoder 260 may be configured to generate the column select signal CS in response to the column address signal CADD received from the control logic 210. For instance, the column decoder 260 may generate the column select signal CS corresponding to the column address signal CADD such that some data selected by the column address signal CADD among the data of the respective page buffers PB may be transferred to the input/output circuit 270 via the cache circuit 250.

The input/output circuit 270 may be configured to transfer the command CMD or the address ADD inputted from an external source, to the control logic 210, or exchange data with the page buffers PB through the cache circuit 250. The input/output circuit 270 may include a plurality of input/output sense amplifiers which generate data by amplifying the voltages of the data lines DL and output the generated data to an input/output path IO.

The input/output path IO may include $2^N$ (N is a natural number of 2 or more) number of data input/output pins. In general, N=3, that is, the input/output path may include eight data input/output pins which may be represented by IO<0> to IO<7>. For instance, in the case where eight data input/output pins are used, the cache circuit 250 may transmit eight data, selected among the data received from the page buffers PB, to the input/output circuit 270 through the data lines DL. The input/output circuit 270 may amplify the eight data received from the cache circuit 250, through sense amplifiers, and may provide the amplified data to the data input/output pins.

The peripheral circuit 200 may include the control logic 210, the voltage generator 220, the row decoder 230, the page buffer circuit 240, the cache circuit 250, the column decoder 260 and the input/output circuit 270. The entire or partial configuration of the peripheral circuit 200 may be disposed under the memory cell array 100. Such a structure is referred to as a PUC (peri under cell) or a COP (cell on peri). The memory device according to the present disclosure may also be applied to the PUC or COP structure.

Figure 2:
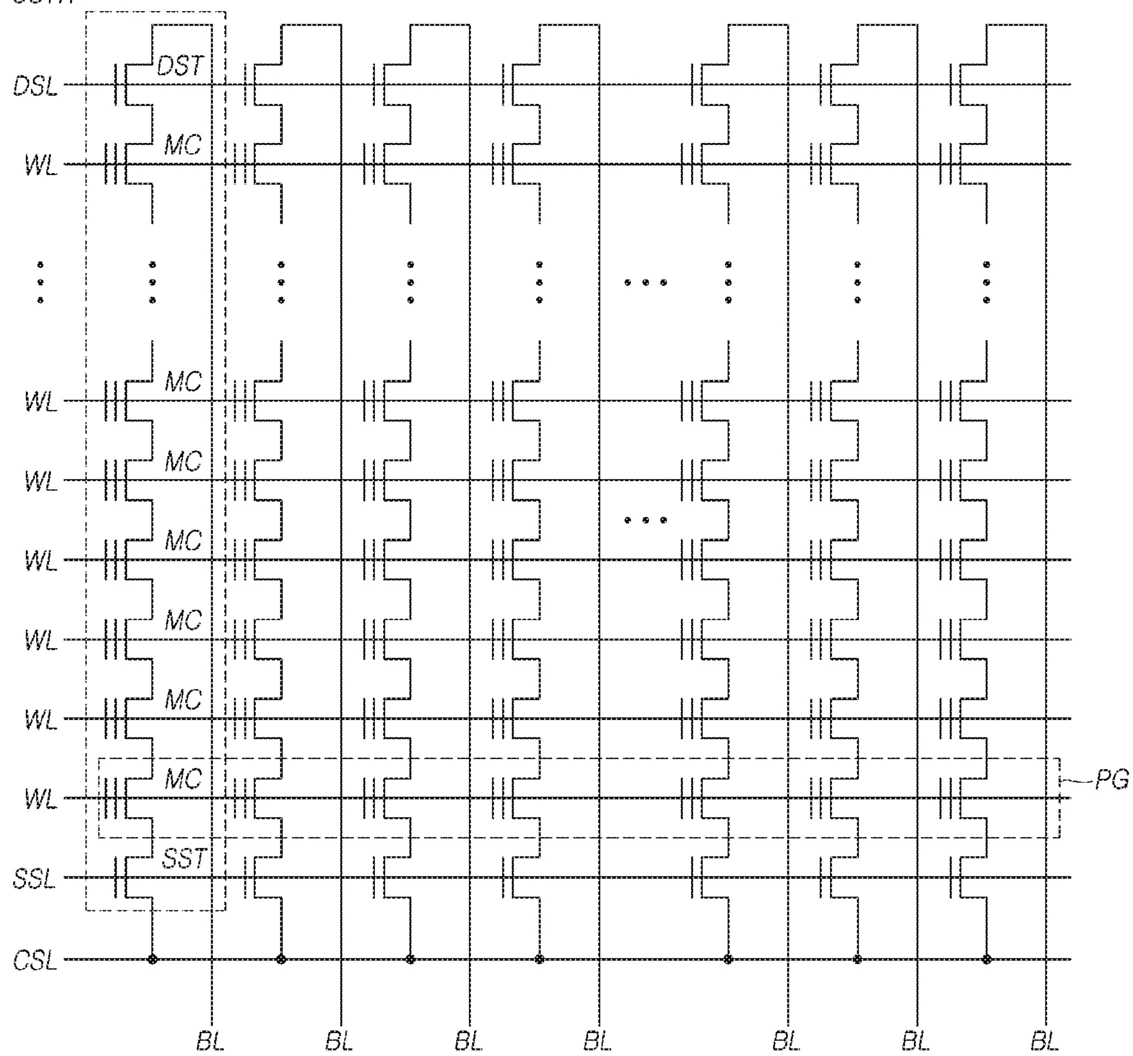
FIG. 2 is a circuit diagram illustrating circuitry of one of the memory blocks shown in FIG. 1.

FIG. 2 is a circuit diagram of one of the memory blocks BLK shown in FIG. 1.

Referring to FIG. 2, the memory block BLK may include a plurality of cell strings CSTR which are coupled between the plurality of bit lines BL and a common source line CSL.

Each of the cell strings CSTR may be coupled between a corresponding bit line BL and the common source line CSL. Each of the cell strings CSTR may include a source select transistor SST which is coupled to the common source line CSL, a drain select transistor DST which is coupled to the bit line BL, and a plurality of memory cells MC which are coupled between the source select transistor SST and the drain select transistor DST. The gate of the source select transistor SST may be coupled to a source select line SSL. The gates of the memory cells MC may be coupled to corresponding word lines WL, respectively. The gate of the drain select transistor DST may be coupled to a drain select line DSL.

The source select line SSL, the word lines WL and the drain select line DSL may be disposed in a direction perpendicular to the bit lines BL. The source select line SSL, the word lines WL and the drain select line DSL may form a three-dimensional structure by being stacked in a vertical direction on the surface of the substrate.

The memory cells MC included in the memory block BLK may be divided into physical page units or logical page units. For example, memory cells MC which share one word line WL and are coupled to different cell strings CSTR may configure one physical page PG. Such a page may be the basic unit of a read operation.

It is illustrated in FIG. 2 that one drain select transistor DST and one source select transistor SST are provided in each of the cell strings CSTR. However, it is to be noted that at least two drain select transistors or at least two source select transistors may be provided in each of the cell strings CSTR.

Figure 3:
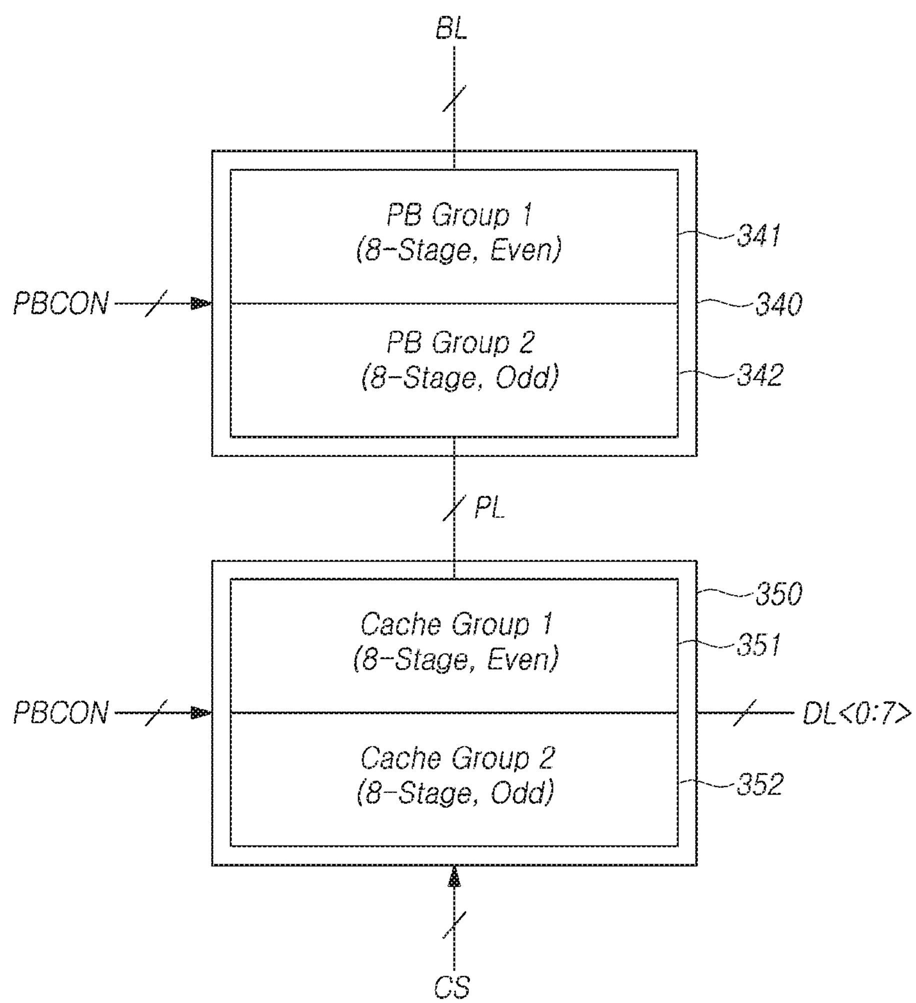
FIGS. 3 and 5 are diagrams illustrating configurations of a page buffer circuit and a cache circuit related to the present disclosure.

FIG. 3 is a diagram illustrating exemplary configurations of a page buffer circuit 340 and a cache circuit 350 of the present disclosure.

Referring to FIG. 3, the page buffer circuit 340 may be divided into a first page buffer group 341 and a second page buffer group 342.

All of the page buffers belonging to the first page buffer group 341 (even page buffers) may be coupled to even bit lines BL, and all of the page buffers belonging to the second page buffer group 342 (odd page buffers) may be coupled to odd bit lines BL. That is to say, whether a particular page buffer is in the first or second page buffer group 341, 342 depends on whether the bit lines BL coupled thereto are even or odd.

In the case where the number of data input/output pins is 8, each of the first and second page buffer groups 341 and 342 may be configured by eight stages. In other words, each of the first and second buffer groups 341 and 342 may be configured by the same number of stages as the number of the data input/output pins.

The cache circuit 350 may be divided into a first cache group 351 and a second cache group 352.

All of the caches belonging to the first cache group 351 (even caches) may be coupled to even page buffers, and all of the caches belonging to the second cache group 352 (odd caches) may be coupled to odd page buffers. That is to say, whether a particular cache is in the first or second cache group 351, 352 depends on whether the page buffers coupled thereto are even or odd.

In the case where the number of data input/output pins is 8, each of the first and second cache groups 351 and 352 may be configured by eight stages. In other words, each of the first and second cache groups 351 and 352 may be configured by the same number of stages as the number of the data input/output pins.

In this way, FIG. 3 illustrates the case where each of the page buffer circuit 340 and the cache circuit 350 is divided into first and second groups depending on whether bit lines or page buffers are even or odd, and each group is configured by the same number of stages as the number of data input/output pins (e.g., 8).

FIG. 4 is a diagram illustrating an example of the detailed layout of the page buffer circuit 340 and the cache circuit 350 of FIG. 3.

Referring to FIG. 4, the first page buffer group 341 may include even page buffers PB which are disposed in a matrix having eight rows. It may be seen that the first page buffer group 341 which is disposed in a matrix having eight rows is configured by eight stages. Since the number of the stages of a page buffer group may be understood as the number of page buffers PB which are arranged along a first direction FD, that is, the direction of bit lines BL, the number of stages may be specified even in the case where page buffers PB are not disposed in a matrix.

The first page buffer group 341 may include eight even page buffers PB Even 0 to 7 in one column. Sixteen-bit lines BL may be provided to each column of the first page buffer group 341. The 16-bit lines BL may include eight even bit lines BL and eight odd bit lines BL. The eight even page buffers PB Even 0 to 7 disposed in each column of the first page buffer group 341 may be coupled to the eight even bit lines BL, respectively, among the 16-bit lines BL. The remaining eight odd bit lines BL among the 16-bit lines BL may be coupled to eight odd page buffers PB Odd 0 to 7, respectively, of the second page buffer group 342 as will be described below.

The second page buffer group 342 may include the odd page buffers PB 0 to 7 which are disposed in a matrix having eight rows. It may be understood that the second page buffer group 342 which is disposed in a matrix having eight rows is configured by eight stages. The eight odd page buffers PB 0 to 7 may be disposed in one column. As mentioned, in each column of the page buffer circuit 340, eight even bit lines BL and eight odd bit lines BL may be provided. The eight odd page buffers PB 0 to 7 disposed in each column of the second page buffer group 342 may be coupled to the eight odd bit lines BL, respectively, among the 16-bit lines BL.

The first cache group 351 may include even caches which are disposed in a matrix having eight rows. In this way, it may be understood that the first cache group 351 which is disposed in a matrix having eight rows is configured by eight stages.

The even caches may be coupled to even page buffers PB. The first cache group 351 may include eight even caches 0 to 7 in one column. Sixteen-page lines PL may be provided to each column of the first cache group 351. The 16-page lines PL may include eight even page lines PL and eight odd page lines PL. The eight even caches 0 to 7 disposed in each column of the first cache group 351 may be coupled to the eight even page lines PL, respectively, among the 16-page lines PL. The remaining eight odd page lines PL among the 16-page lines PL may be coupled to eight odd caches 0 to 7, respectively, of the second cache group 352 as will be described below.

The second cache group 352 may include the odd caches 0 to 7 which are disposed in a matrix having eight rows. In this way, it may be understood that the second cache group 352 which is disposed in a matrix having eight rows is configured by eight stages. The eight odd caches 0 to 7 may be disposed in one column. The eight odd caches 0 to 7 disposed in one column of the second cache group 352 may be coupled to the eight odd page lines PL, respectively, among the 16-page lines PL.

In the page buffer circuit 340, even and odd page buffers 3411 and 3412, marked by two bold boxes respectively may configure together one page buffer input/output unit. For example, the eight even page buffers PB 0 to 7 belonging to the first column of the first page buffer group 341 and the eight odd page buffers PB 0 to 7 belonging to the first column of the second page buffer group 342 may configure together one page buffer input/output unit. Also, in the cache circuit 350, even and odd caches 3511 and 3512 marked with two bold boxes may configure together one cache input/output unit. For example, the eight even caches 0 to 7 belonging to the first column of the first cache group 351 and the eight odd caches 0 to 7 belonging to the first column of the second cache group 352 may configure together one cache input/output unit.

A page buffer input/output unit may cooperate with a cache input/output unit. For instance, the data of the eight even page buffers PB Even 0 to 7 belonging to the page buffer input/output unit 3411 may be stored in the cache input/output unit 3511 configured by even caches 0 to 7, may be transferred to an input/output circuit through data lines DL, and may then be simultaneously transferred to externally through eight data input/output pins. Further, for instance, the data of the eight odd page buffers PB 0 to 7 belonging to the page buffer input/output unit 3412 may be stored in the cache input/output unit 3512 configured by odd caches 0 to 7, may be transferred to the input/output circuit through the data lines DL, and may then be simultaneously transferred externally through the eight data input/output pins.

Referring to FIG. 4, since even caches 0 are disposed in the first row of the respective columns of the first cache group 351 and even caches 1 are disposed in the second row of the respective columns of the first cache group 351, data lines DL<0:1> corresponding to the even caches 0 and 1 may be disposed between the first row and second row of the first cache group 351. The numerals 0 to 7 described in 'Even 0,' 'Even 1' and the like may represent pins of the eight data input/output pins IO<0:7> respectively corresponding to the eight even/odd caches. Data lines DL<2:3> may be disposed between the third row and fourth row of the first cache group 351, data lines DL<4:5> may be disposed between the fifth row and sixth row of the first cache group 351, and data lines DL<6:7> may be disposed between the seventh row and eighth row of the first cache group 351.

While it is illustrated in FIG. 4 that each of the first page buffer group 341, the second page buffer group 342, the first cache group 351 and the second cache group 352 has three columns, this is only an example; such groups may be formed in a size corresponding to the page (PG) size of a memory cell array.

Figure 5:
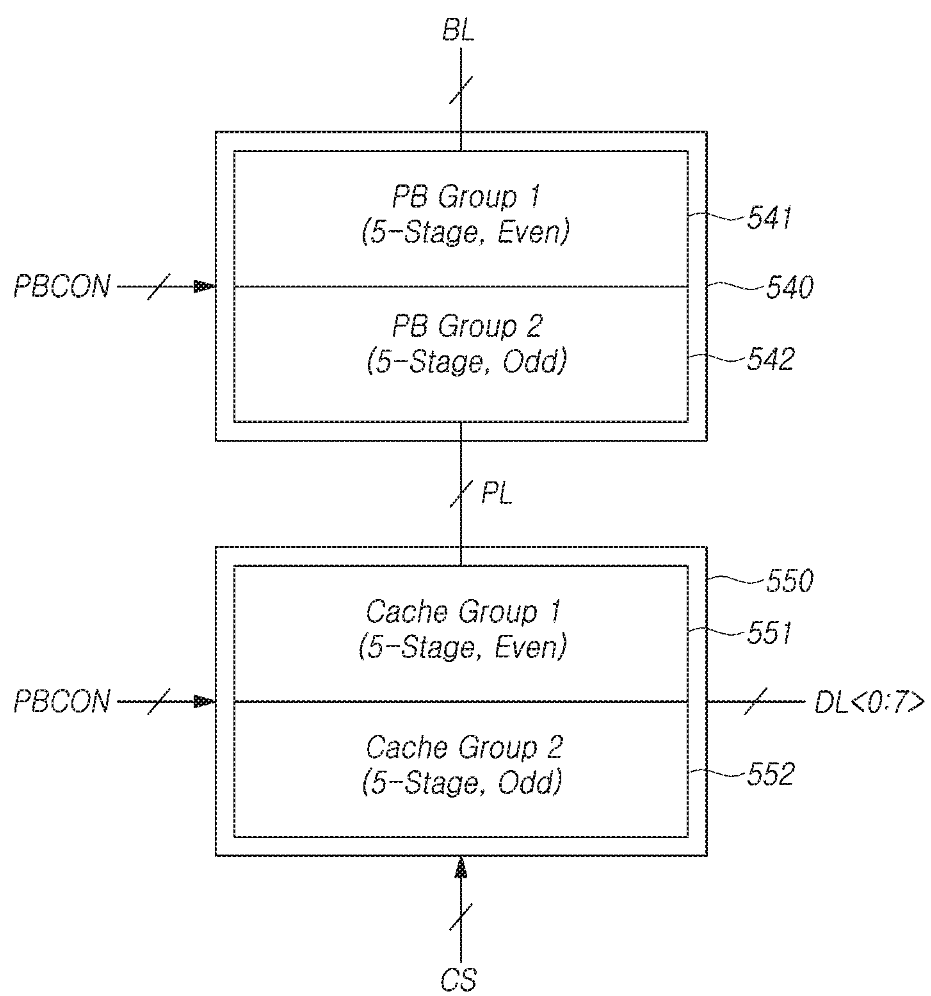
Figure 6:
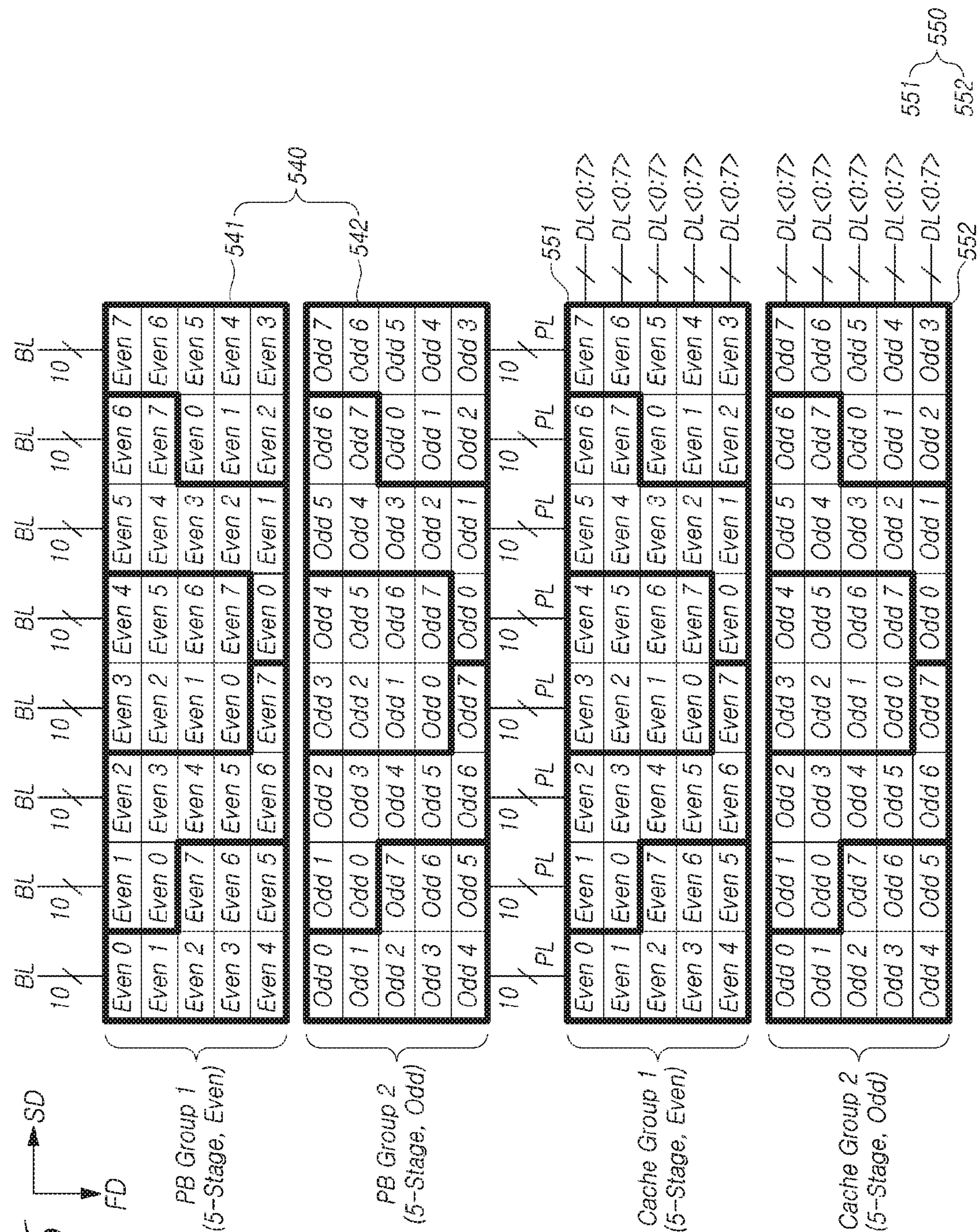

FIG. 5 is a diagram illustrating exemplary configurations of a page buffer circuit 540 and a cache circuit 550 related with the present disclosure, and FIG. 6 is a diagram illustrating an example of the detailed layout of the page buffer circuit 540 and the cache circuit 550 of FIG. 5.

Referring to FIG. 5, the depicted configuration is different from FIG. 3 in that each of a first page buffer group 541 and a second page buffer group 542 has five stages and each of a first cache group 551 and a second cache group 552 has five stages. Even in FIG. 5, it is assumed that the number of data input/output pins is 8 as in FIG. 3. Namely, FIG. 5 illustrates the case where the number of stages in each of the first page buffer group 541, the second page buffer group 542, the first cache group 551 and the second cache group 552 is 5 even when the number of data input/output pins is 8.

Referring to FIG. 6, the first page buffer group 541 may include even page buffers 0 to 7 which are disposed in a matrix having five rows. The even page buffers 0 to 7 belonging to the first page buffer group 541 may be coupled to even bit lines BL. The first page buffer group 541 may include five even page buffers PB Even in one column. Ten-bit lines BL may be provided to each column of the first page buffer group 541. The 10-bit lines BL may include five even bit lines BL and five odd bit lines BL. The five even page buffers PB Even disposed in one column of the first page buffer group 541 may be coupled to the five even bit lines BL, respectively, among the 10-bit lines BL. The remaining five odd bit lines BL among the 10-bit lines BL may be respectively coupled to five odd page buffers PB of the second page buffer group 542.

The second page buffer group 542 may be configured in the same manner as the first page buffer group 541 except that even page buffers are changed to odd page buffers.

The 80-page buffers PB in the page buffer circuit 540 may configure five-page buffer input/output units as indicated by the bold lines in FIG. 6. Each page buffer input/output unit may include eight even page buffers, Even 0 to Even 7, belonging to the first page buffer group 541 and eight odd page buffers, Odd 0 to Odd 7, belonging to the second page buffer group 542. Since each of the first page buffer group 541 and the second page buffer group 542 is configured by five stages, each page buffer input/output unit may be disposed over two columns or three columns.

The first cache group 551 may include even caches 0 to 7 which are disposed in a matrix having five rows. The even caches 0 to 7 belonging to the first cache group 551 may be coupled to even page buffers. The first cache group 551 may include five even caches in one column. Ten-page lines PL may be provided to each column of the first cache group 551. The 10-page lines PL may include five even page lines PL and five odd page lines PL. The five even caches disposed in one column of the first cache group 551 may be coupled to the five even page lines PL, respectively, among the 10-page lines PL. The remaining five odd page lines PL among the 10-page lines PL may be respectively coupled to five odd caches of the second cache group 552.

The second cache group 552 may be configured in the same manner as the first cache group 551 except that even caches are changed to odd caches.

The 80 caches in the cache circuit 550 may configure five cache input/output units as indicated by the bold lines in FIG. 6. Each cache input/output unit may include eight even caches, Even 0 to Even 7, belonging to the first cache group 551 and eight odd caches, Odd 0 to Odd 7, belonging to the second cache group 552. Since each of the first cache group 551 and the second cache group 552 is configured by five stages, each cache input/output unit may be disposed over two columns or three columns.

Referring to FIG. 6, since even caches 0 to 7 are disposed in the first row of the respective columns of the first cache group 551, all of eight data lines DL<0:7> should be disposed in the first row of the first cache group 551. In each of the other rows of the first cache group 551, all of eight data lines DL<0:7> also should be disposed.

Two examples of the page buffer circuit and the cache circuit related with the present disclosure were described with reference to FIGS. 3 to 6. In the case of FIGS. 3 and 4, there is a problem in that the lengths of the page buffer circuit 340 and the cache circuit 350 in the direction of bit lines BL increase and thus an area increases, since each of the page buffer groups 341 and 342 and each of the cache groups 351 and 352 have the same number of stages as the number of data input/output pins. In the case of FIGS. 5 and 6, the arrangement is disadvantageous in that a large number of data lines DL coupled to the inside of the cache circuit 550 are needed, which complicates the layout.

Configurations of a page buffer circuit and a cache circuit in accordance with embodiments will be described with reference to FIGS. 7 to 24.

Figure 7:
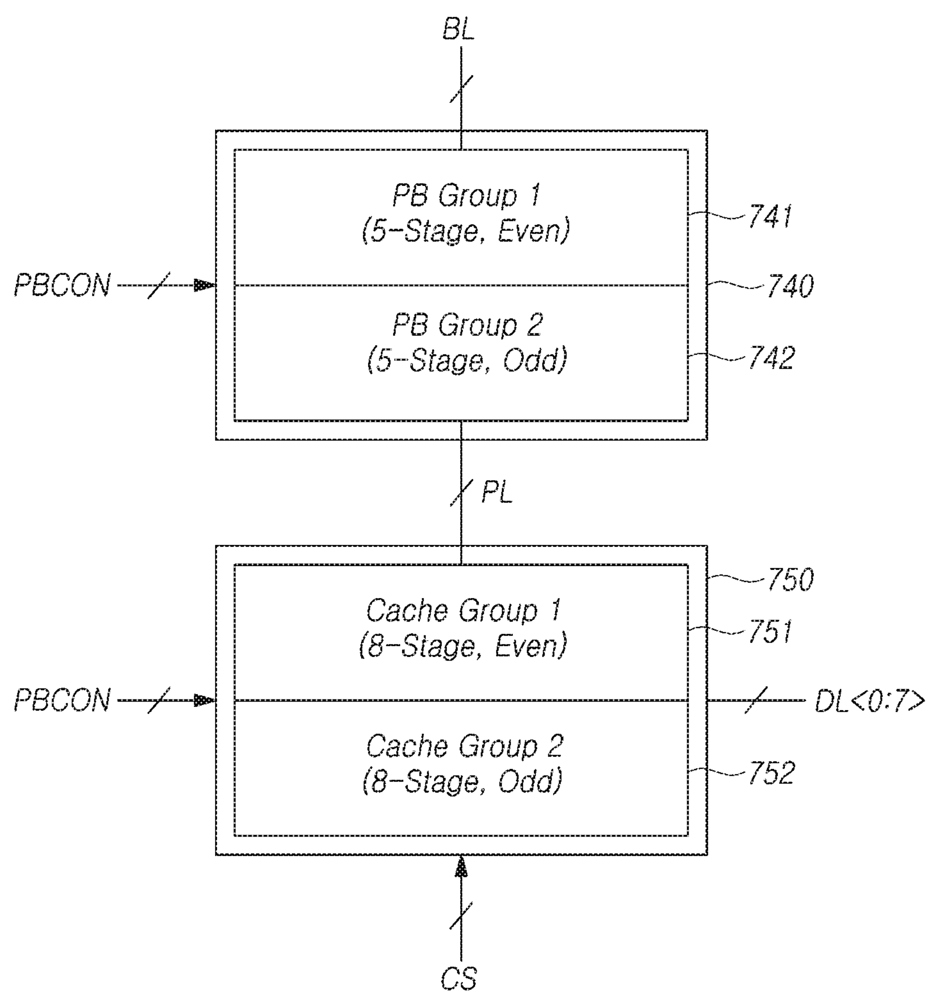
FIGS. 7, 9, 11, 13, 15, 17, 19, 21 and 23 are diagrams illustrating exemplary configurations of a page buffer circuit and a cache circuit in accordance with embodiments.
Figure 8:
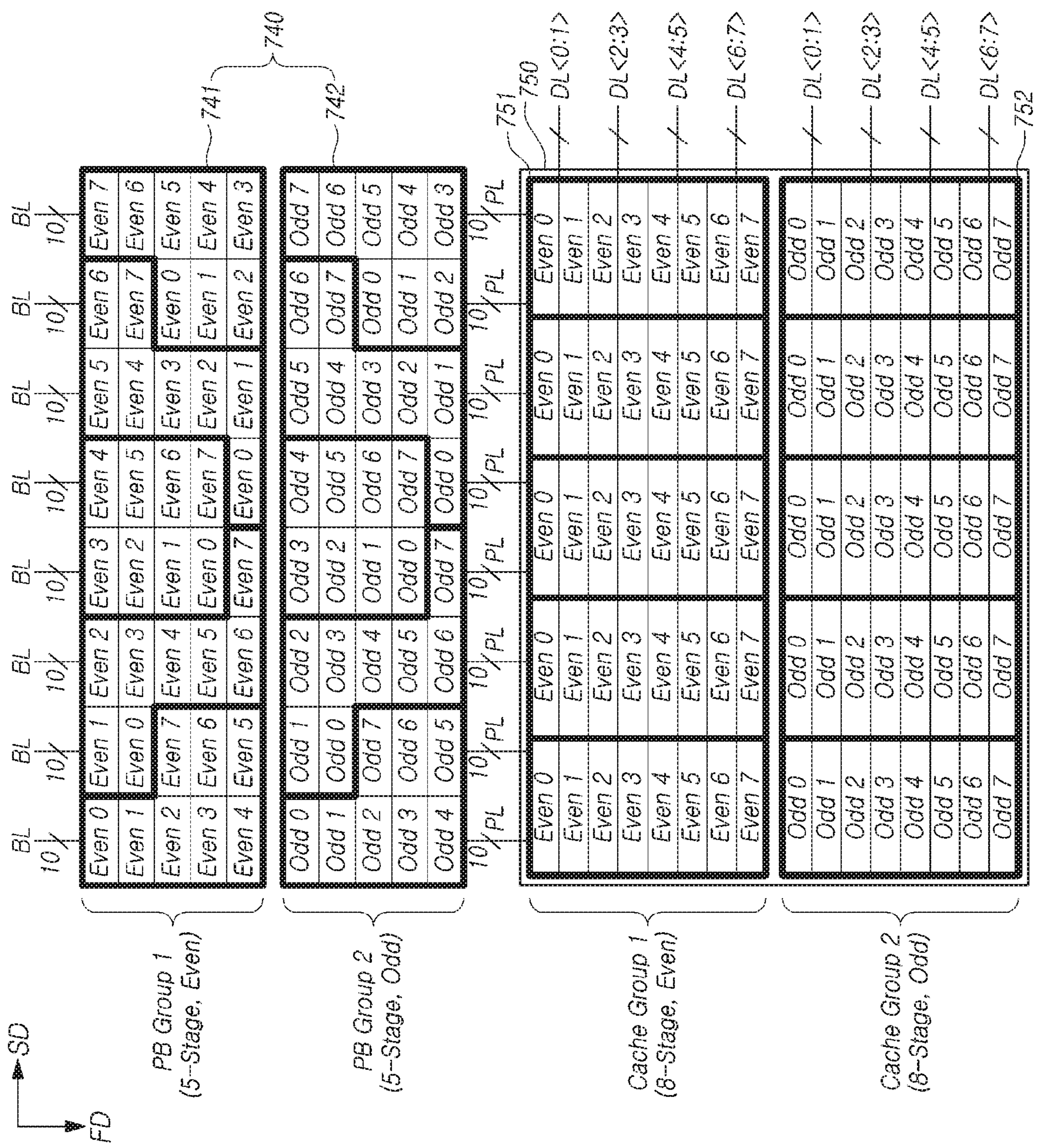

FIG. 7 is a block diagram illustrating exemplary configurations of a page buffer circuit 740 and a cache circuit 750 in accordance with an embodiment, and FIG. 8 is a diagram illustrating an example of the detailed layout of the page buffer circuit 740 and the cache circuit 750 of FIG. 7.

Referring to FIG. 7, the page buffer circuit 740 may include a first page buffer group 741 and a second page buffer group 742, and the cache circuit 750 may include a first cache group 751 and a second cache group 752.

In the case where eight data input/output pins are used, each of the first page buffer group 741 and the second page buffer group 742 may include five stages, and each of the first cache group 751 and the second cache group 752 may include eight stages. The first page buffer group 741 and the second page buffer group 742 may be divided depending on whether the bit lines BL coupled thereto are even or odd, and the first cache group 751 and the second cache group 752 may be divided depending on whether corresponding page buffers are even or odd (that is, whether corresponding bit lines are even or odd).

Referring to FIG. 8, each of the first page buffer group 741 and the second page buffer group 742 may include page buffers PB which are disposed in a matrix having five rows. The page buffers PB belonging to the first page buffer group 741 may be even page buffers PB Even which are coupled to even bit lines BL, and the page buffers PB belonging to the second page buffer group 742 may be odd page buffers PB Odd which are coupled to odd bit lines BL.

The 80-page buffers PB in the page buffer circuit 740 may configure five-page buffer input/output units as indicated by the bold lines in FIG. 8. Each page buffer input/output unit may include eight even page buffers, Even 0 to Even 7, belonging to the first page buffer group 741 and eight odd page buffers, Odd 0 to Odd 7, belonging to the second page buffer group 742. Since each of the first page buffer group 741 and the second page buffer group 742 is configured by five stages, each page buffer input/output unit may be disposed over two columns or three columns.

Each of the first cache group 751 and the second cache group 752 may include caches which are disposed in a matrix having eight rows. The caches belonging to the first cache group 751 may be even caches which are coupled to even page buffers, and the caches belonging to the second cache group 752 may be odd caches which are coupled to odd page buffers.

The 80 caches in the cache circuit 750 may configure five cache input/output units as indicated by the bold lines in FIG. 8. Each cache input/output unit may include eight even caches, Even 0 to Even 7, belonging to the first cache group 751 and eight odd caches, Odd 0 to Odd 7, belonging to the second cache group 752. Since each of the first cache group 751 and the second cache group 752 is configured by eight stages, each cache input/output unit may be configured by one column.

Referring to FIG. 8, since only caches corresponding to one data input/output pin are disposed in each row of the cache circuit 750, two data lines DL may be wired between two rows of the cache circuit 750. Therefore, since the number of necessary data lines DL is small, the wiring of the data lines DL may be easily carried out.

The data lines DL may be wired in respective rows instead of being disposed between two rows of the cache circuit 750 (not shown). For example, it is possible to dispose the data line DL<0> in the first row of the first cache group 751 and dispose the data line DL<1> in the second row of the first cache group 751.

Also, while it is illustrated in FIG. 8 that one page buffer PB and one cache are coupled through a corresponding page line PL, a method of coupling a page buffer PB and a cache is not limited thereto. For instance, a plurality of page buffers PB and a plurality of caches may share a page line PL.

According to the embodiment of FIGS. 7 and 8, by decreasing the number of stages of the page buffer circuit 740 while maintaining the number of stages of each of the cache groups 751 and 752 to be the same as the number of data input/output pins, the area of the page buffer circuit 740 may be reduced while not increasing the number of data lines DL. As a result, it is possible to increase the degree of integration of a memory device.

Figure 9:
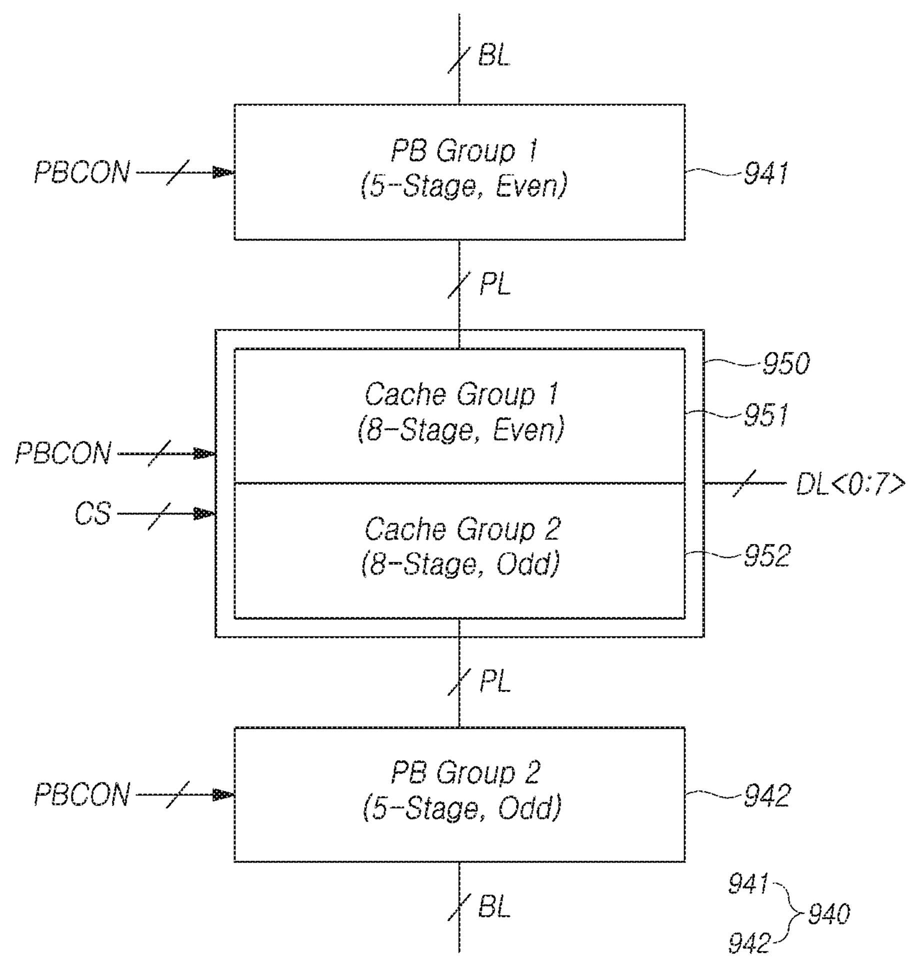
Figure 10:
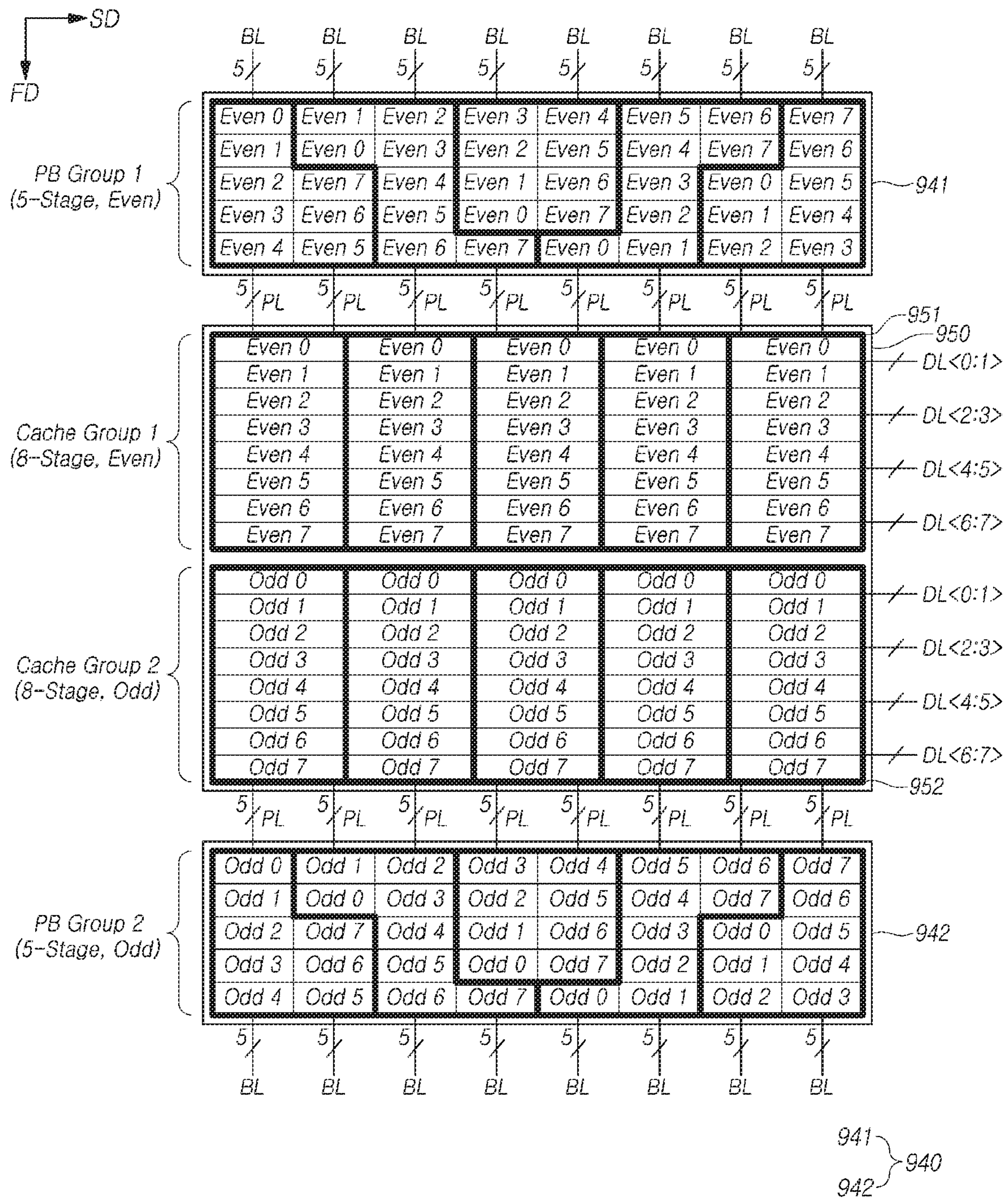

FIG. 9 is a block diagram illustrating exemplary configurations of a page buffer circuit 940 and a cache circuit 950 in accordance with an embodiment, and FIG. 10 is a diagram illustrating an example of the detailed layout of the page buffer circuit 940 and the cache circuit 950 of FIG. 9.

Referring to FIG. 9, the present embodiment is different from the embodiment illustrated in FIG. 7 in that a first page buffer group 941 and a second page buffer group 942 are separated from each other and are disposed at opposite sides of the cache circuit 950. According to this configuration, the first page buffer group 941 and the second page buffer group 942 may be coupled to a first cache group 951 and a second cache group 952 through corresponding page lines PL.

Referring to FIG. 10, each of the first page buffer group 941 and the second page buffer group 942 may include page buffers which are disposed in a matrix having five rows. The page buffers belonging to the first page buffer group 941 may be even page buffers which are coupled to even bit lines BL, and the page buffers belonging to the second page buffer group 942 may be odd page buffers which are coupled to odd bit lines BL.

Five even bit lines BL may be provided to each column of the first page buffer group 941, and each of even page buffers belonging to each column may be coupled to one even bit line BL. Five odd bit lines BL may be provided to each column of the second page buffer group 942, and each of odd page buffers belonging to each column may be coupled to one odd bit line BL.

The 80-page buffers in the page buffer circuit 940 may configure five-page buffer input/output units as indicated by the bold lines in FIG. 10. Each page buffer input/output unit may include eight even page buffers, Even 0 to Even 7, belonging to the first page buffer group 941 and eight odd page buffers, Odd 0 to Odd 7, belonging to the second page buffer group 942. Since each of the first page buffer group 941 and the second page buffer group 942 is configured by five stages, each page buffer input/output unit may be disposed over two columns or three columns.

Each of the first cache group 951 and the second cache group 952 may include caches which are disposed in a matrix having eight rows. The caches belonging to the first cache group 951 may be even caches which are coupled to even page buffers, and the caches belonging to the second cache group 952 may be odd caches which are coupled to odd page buffers.

The 80 caches in the cache circuit 950 may configure five cache input/output units as indicated by the bold lines in FIG. 10. Each cache input/output unit may include eight even caches, Even 0 to Even 7, belonging to the first cache group 951 and eight odd caches, Odd 0 to Odd 7, belonging to the second cache group 952. Since each of the first cache group 951 and the second cache group 952 is configured by eight stages, each cache input/output unit may be configured by one column.

The input/output units of the first page buffer group 941 may be coupled to the input/output units of the corresponding first cache group 951 through page lines PL. For instance, eight even page buffers belonging to one page buffer input/output unit in the first page buffer group 941 may be coupled to eight even caches belonging to the corresponding cache input/output unit of the first cache group 951 through eight-page lines PL. To this end, five-page lines PL may be provided to each column of the first page buffer group 941. The input/output units of the second page buffer group 942 may also be coupled to the input/output units of the second cache group 952 in a similar manner.

Referring to FIG. 10, since only caches corresponding to one data input/output pin are disposed in each row of the cache circuit 950, one data line DL may be wired in each row of the cache circuit 950 or two data lines DL may be wired between two rows of the cache circuit 950. Therefore, the wiring of the data lines DL may be easily carried out.

According to the embodiment of FIGS. 9 and 10, by decreasing the number of stages of each of the page buffer groups 941 and 942 while maintaining the number of stages of each of the cache groups 951 and 952 to be the same as the number of data input/output pins, the area of the page buffer circuit 940 may be reduced while not increasing the number of data lines DL. As a result, it is possible to increase the degree of integration of a memory device. In addition, by separating the first page buffer group 941 and the second page buffer group 942 and disposing them at opposite sides of the cache circuit 950, the wiring of the page lines PL may be easily carried out.

Figure 11:
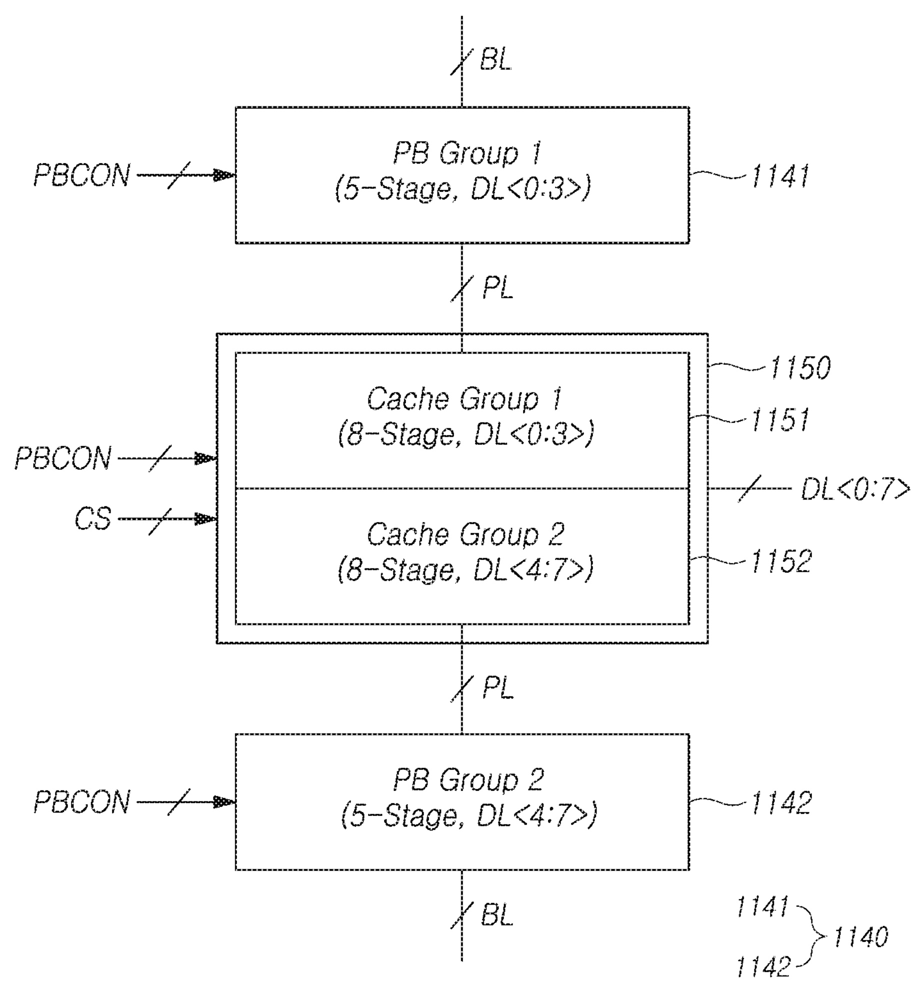
Figure 12:
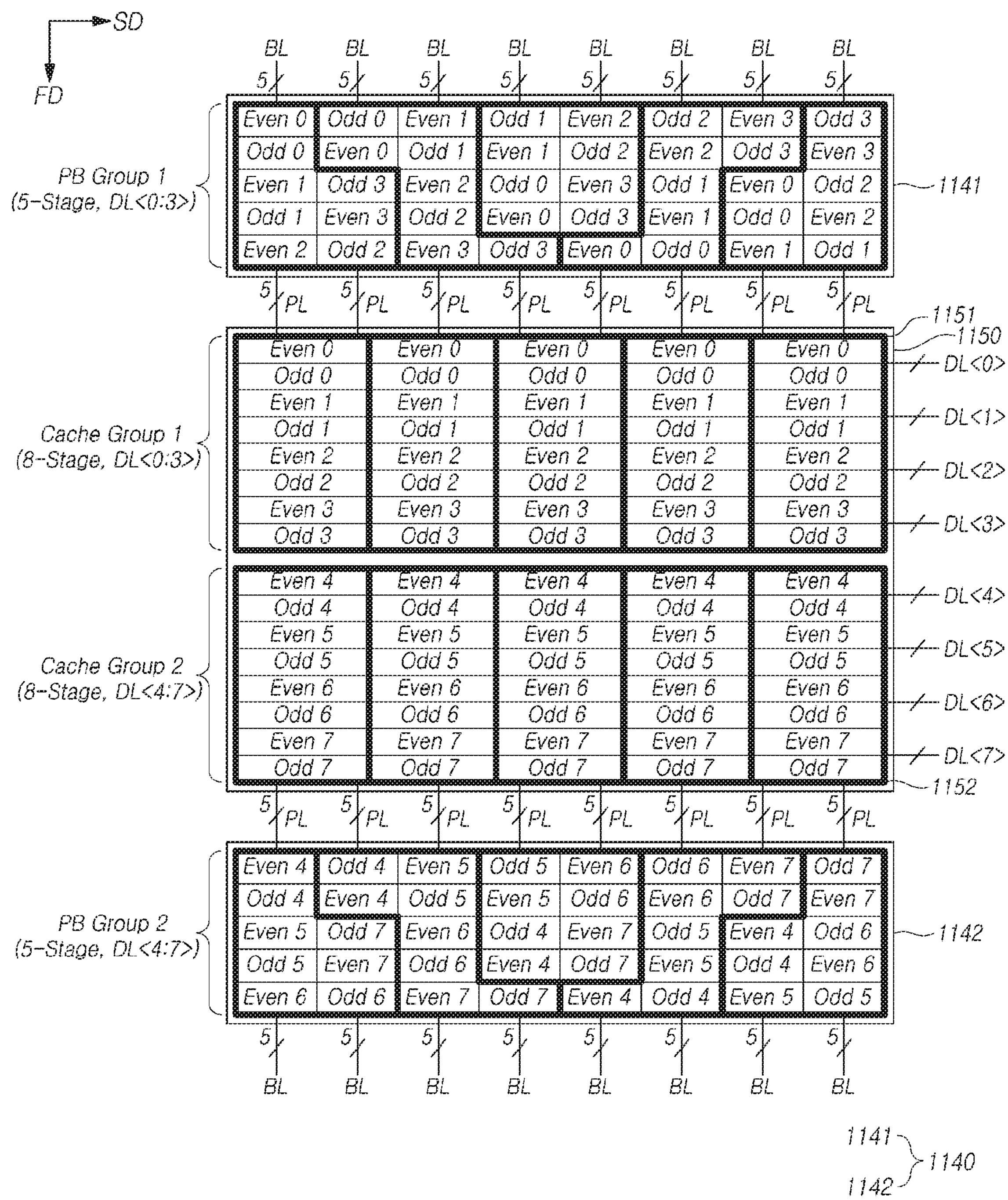

FIG. 11 is a block diagram illustrating exemplary configurations of a page buffer circuit 1140 and a cache circuit 1150 in accordance with an embodiment, and FIG. 12 is a diagram illustrating an example of the detailed layout of the page buffer circuit 1140 and the cache circuit 1150 of FIG. 11.

Referring to FIG. 11, the page buffer circuit 1140 may include a first page buffer group 1141 and a second page buffer group 1142, and the cache circuit 1150 may include a first cache group 1151 and a second cache group 1152. In the case where eight data input/output pins are used, each of the first page buffer group 1141 and the second page buffer group 1142 may be configured by five stages, and each of the first cache group 1151 and the second cache group 1152 may be configured by eight stages.

The first page buffer group 1141 and the second page buffer group 1142 may be divided depending on corresponding data input/output pins. For instance, the first page buffer group 1141 may include page buffers corresponding to first to fourth data input/output pins IO<0:3>, and the second page buffer group 1142 may include page buffers corresponding to fifth to eighth data input/output pins IO<4:7>. Since data input/output pins may be matched to data lines DL, respectively, the division depending on data input/output pins may be understood as division depending on coupled data lines DL. Similarly, the first cache group 1151 and the second cache group 1152 may also be divided depending on corresponding data input/output pins.

Referring to FIG. 12, each of the first page buffer group 1141 and the second page buffer group 1142 may include page buffers which are disposed in a matrix having five rows. The page buffers belonging to the first page buffer group 1141 may be page buffers corresponding to the first to fourth data input/output pins IO<0:3>, and the page buffers belonging to the second page buffer group 1142 may be page buffers corresponding to the fifth to eighth data input/output pins IO<4:7>.

Each of the first cache group 1151 and the second cache group 1152 may include caches which are disposed in a matrix having eight rows. For instance, the caches belonging to the first cache group 1151 may be caches corresponding to the first to fourth data input/output pins IO<0:3>, and the caches belonging to the second cache group 1152 may be caches corresponding to the fifth to eighth data input/output pins IO<4:7>. By such a layout, all of the caches belonging to the first and second rows of the first cache group 1151 may be coupled to the first data input/output pin IO<0>. Thus, since one data line DL may be wired to two rows of the cache circuit 1150, the number of data lines DL may be decreased.

The eight-page buffers. Even 0 to 3 and Odd 0 to 3, belonging to the first page buffer group 1141 and the eight-page buffers, Even 4 to 7 and Odd 4 to 7, belonging to the second page buffer group 1142 may configure one page buffer input/output unit. The eight caches, Even 0 to 3 and Odd 0 to 3, belonging to the first cache group 1151 and the eight caches, Even 4 to 7 and Odd 4 to 7, belonging to the second cache group 1152 may configure one cache input/output unit. Each page buffer input/output unit may be coupled to a corresponding cache input/output unit through page lines PL.

The embodiment of FIGS. 11 and 12 provides not only the advantage of the embodiment of FIGS. 9 and 10 but also another advantage in that the number of data lines DL may be decreased as each of the page buffer circuit 1140 and the cache circuit 1150 is divided into two groups depending on data input/output pins.

Figure 13:
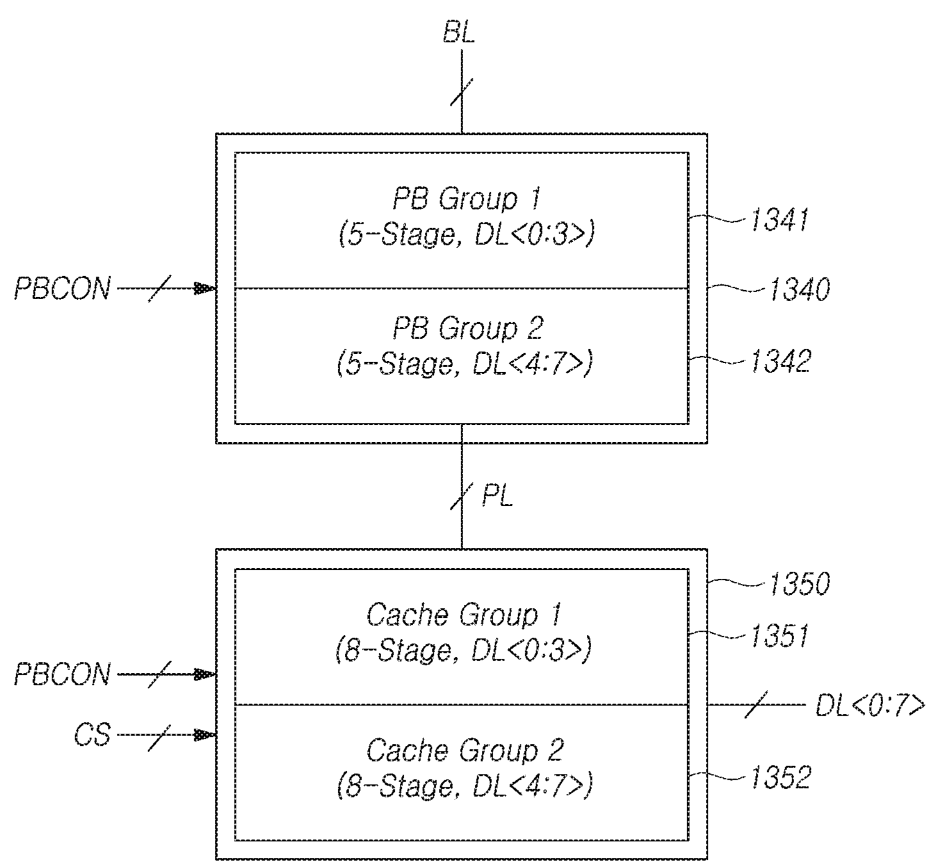
Figure 14:
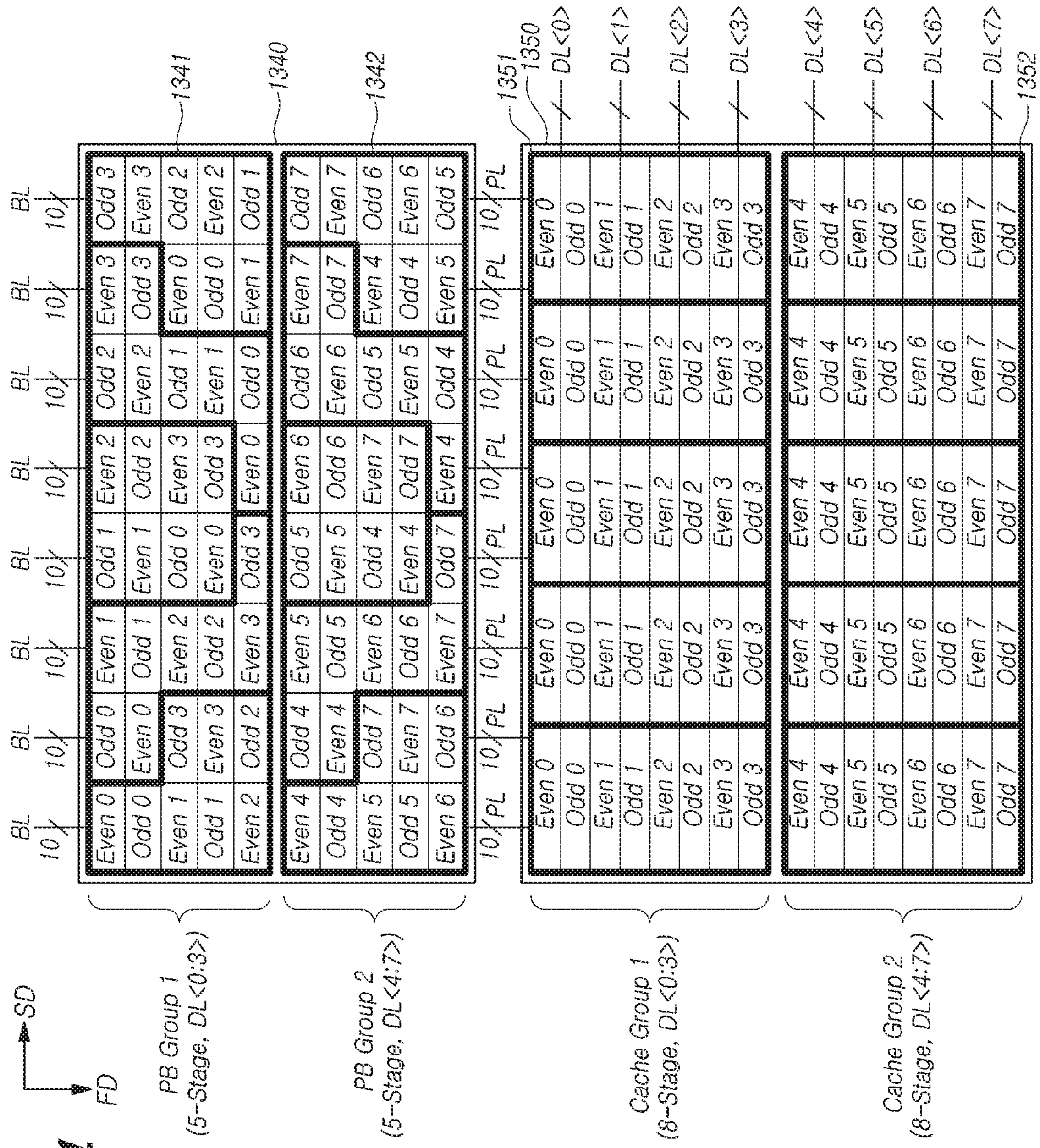

FIG. 13 is a block diagram illustrating exemplary configurations of a page buffer circuit 1340 and a cache circuit 1350 in accordance with an embodiment, and FIG. 14 is a diagram illustrating an example of the detailed layout of the page buffer circuit 1340 and the cache circuit 1350 of FIG. 13.

Referring to FIG. 13, the page buffer circuit 1340 may include a first page buffer group 1341 and a second page buffer group 1342, and the cache circuit 1350 may include a first cache group 1351 and a second cache group 1352. In the case where eight data input/output pins are used, each of the first page buffer group 1341 and the second page buffer group 1342 may be configured by five stages, and each of the first cache group 1351 and the second cache group 1352 may be configured by eight stages.

The first page buffer group 1341 and the second page buffer group 1342 may be divided depending on corresponding data input/output pins. For instance, the first page buffer group 1341 may include page buffers corresponding to first to fourth data input/output pins IO<0:3>, and the second page buffer group 1342 may include page buffers corresponding to fifth to eighth data input/output pins IO<4:7>. Similarly, the first cache group 1351 and the second cache group 1352 may also be divided depending on corresponding data input/output pins.

Referring to FIG. 14, each of the first page buffer group 1341 and the second page buffer group 1342 may include page buffers which are disposed in a matrix having five rows. The page buffers belonging to the first page buffer group 1341 may be page buffers corresponding to the first to fourth data input/output pins IO<0:3>, and the page buffers belonging to the second page buffer group 1342 may be page buffers corresponding to the fifth to eighth data input/output pins IO<4:7>.

Each of the first cache group 1351 and the second cache group 1352 may include caches which are disposed in a matrix having eight rows. For instance, the caches belonging to the first cache group 1351 may be caches corresponding to the first to fourth data input/output pins IO<0:3>, and the caches belonging to the second cache group 1352 may be caches corresponding to the fifth to eighth data input/output pins IO<4:7>. By such a layout, all of the caches belonging to two rows of the cache circuit 1350 may be coupled to the same data line DL. Thus, since one data line DL may be wired to two rows of the cache circuit 1350, the number of data lines DL may be decreased.

The eight-page buffers, Even 0 to 3 and Odd 0 to 3, belonging to the first page buffer group 1341 and the eight-page buffers, Even 4 to 7 and Odd 4 to 7, belonging to the second page buffer group 1342 may configure one page buffer input/output unit. The eight caches, Even 0 to 3 and Odd 0 to 3, belonging to the first cache group 1351 and the eight caches, Even 4 to 7 and Odd 4 to 7, belonging to the second cache group 1352 may configure one cache input/output unit. Each page buffer input/output unit may be coupled to a corresponding cache input/output unit through page lines PL.

According to the embodiment of FIGS. 13 and 14, by decreasing the number of stages of each of the page buffer groups 1341 and 1342 while maintaining the number of stages of each of the cache groups 1351 and 1352 to be the same as the number of data input/output pins, not only the area of the page buffer circuit 1340 may be reduced while not increasing the number of data lines DL, thereby increasing the degree of integration of a memory device, but also wiring of data lines may be reduced.

Figure 15:
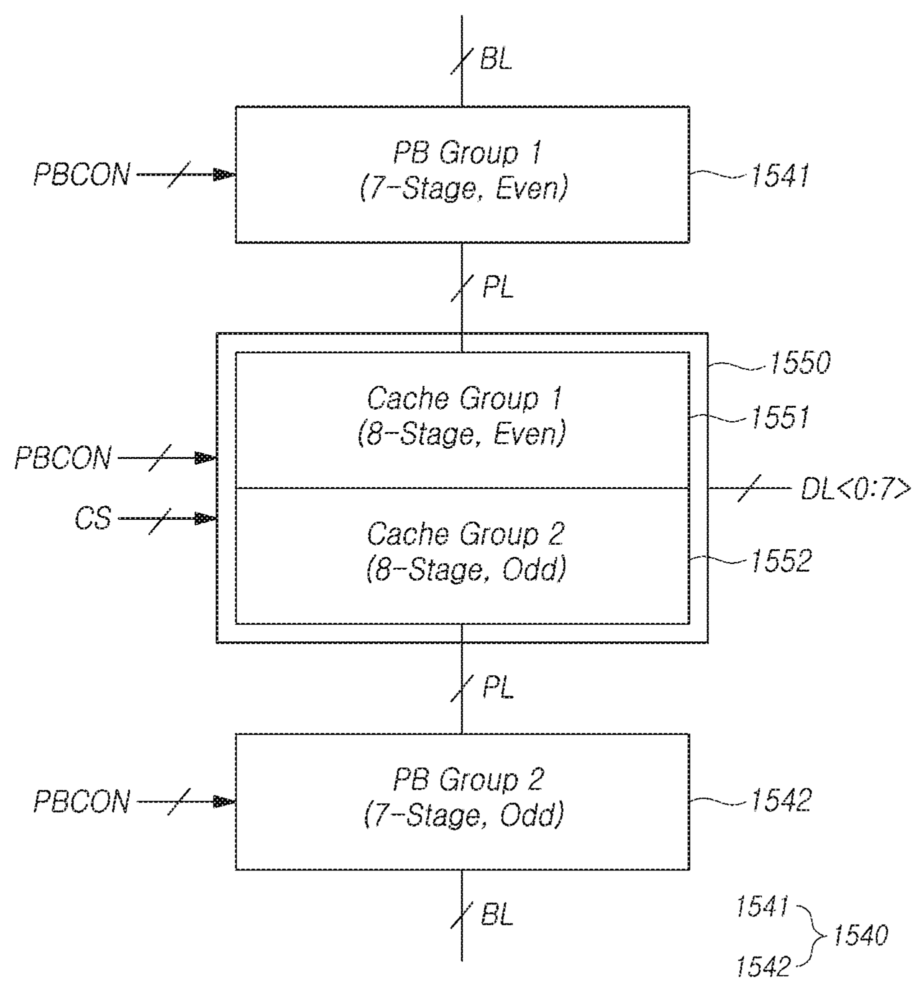
Figure 16:
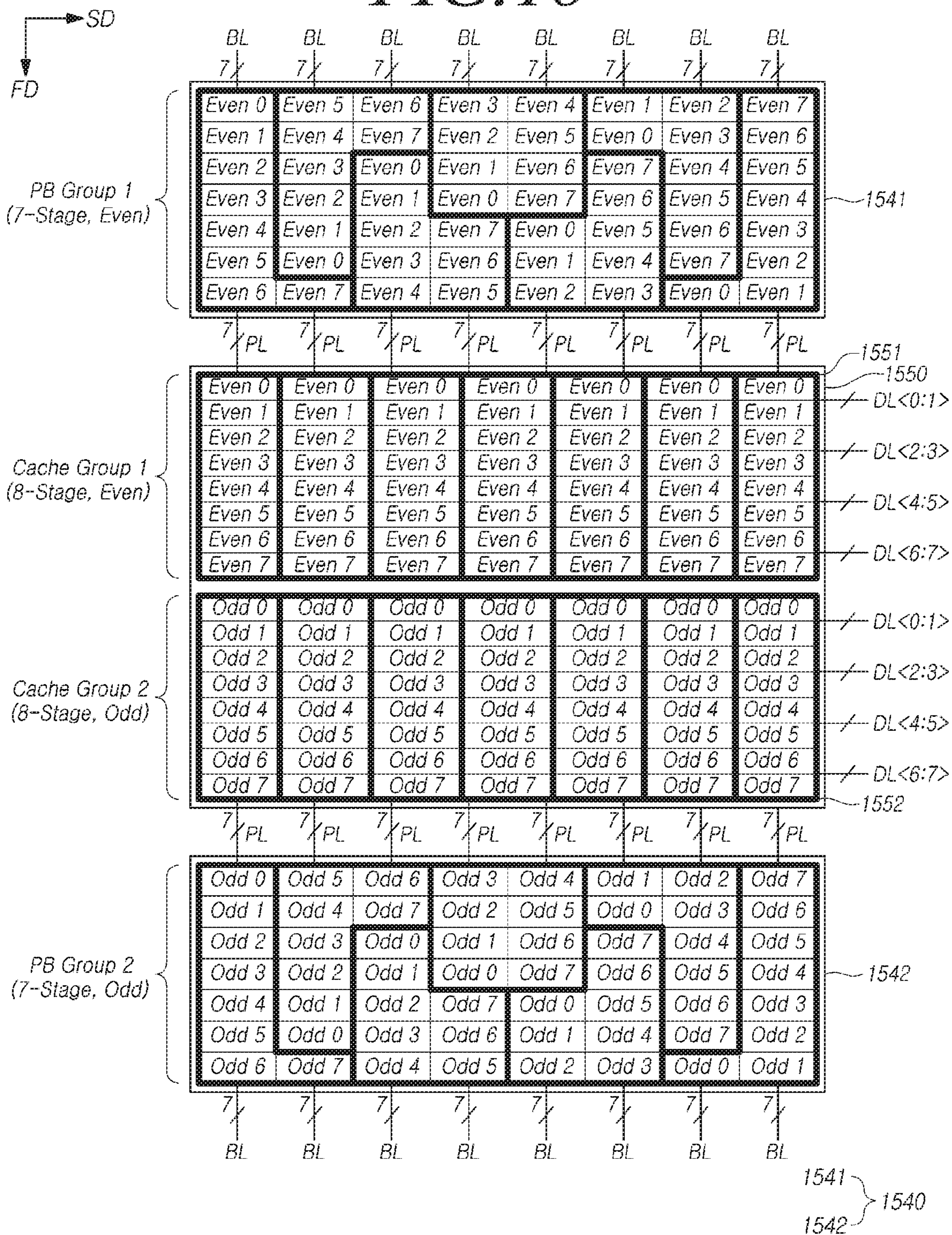

FIG. 15 is a block diagram illustrating exemplary configurations of a page buffer circuit 1540 and a cache circuit 1550 in accordance with an embodiment, and FIG. 16 is a diagram illustrating an example of the detailed layout of the page buffer circuit 1540 and the cache circuit 1550 of FIG. 15.

Referring to FIG. 15, the page buffer circuit 1540 may include a first page buffer group 1541 and a second page buffer group 1542, and the cache circuit 1550 may include a first cache group 1551 and a second cache group 1552. In the case where eight data input/output pins are used, each of the first page buffer group 1541 and the second page buffer group 1542 may be configured by seven stages, and each of the first cache group 1551 and the second cache group 1552 may be configured by eight stages. The first page buffer group 1541 and the second page buffer group 1542 may be separated from each other and be disposed at opposite sides of the cache circuit 1550.

The first page buffer group 1541 and the second page buffer group 1542 may be divided depending on whether the bit lines BL coupled thereto are even or odd. For instance, the first page buffer group 1541 may include page buffers corresponding to even bit lines, and the second page buffer group 1542 may include page buffers corresponding to odd bit lines. Similarly, the first cache group 1551 and the second cache group 1552 may also be divided depending on whether corresponding bit lines BL are even or odd.

Referring to FIG. 16, each of the first page buffer group 1541 and the second page buffer group 1542 may include page buffers which are disposed in a matrix having seven rows. For instance, the page buffers belonging to the first page buffer group 1541 may be page buffers corresponding to even bit lines BL, and the page buffers belonging to the second page buffer group 1542 may be page buffers corresponding to odd bit lines BL.

Each of the first cache group 1551 and the second cache group 1552 may include caches which are disposed in a matrix having eight rows. For instance, the caches belonging to the first cache group 1551 may be caches corresponding to even page buffers (that is, even bit lines), and the caches belonging to the second cache group 1552 may be caches corresponding to the odd page buffers (that is, odd bit lines).

The 112-page buffers belonging to the page buffer circuit 1540 may configure seven-page buffer input/output units as indicated by the bold lines in FIG. 16. For instance, the eight-page buffers, Even 0 to 7, belonging to the first page buffer group 1541 and the eight-page buffers, Odd 0 to 7, belonging to the second page buffer group 1542 may configure together one page buffer input/output unit. The eight caches, Cache Even 0 to 7, belonging to the first cache group 1551 and the eight caches, Odd 0 to 7, belonging to the second cache group 1552 may configure together one cache input/output unit. Each page buffer input/output unit may be coupled to a corresponding cache input/output unit through page lines PL. Since each of the first page buffer group 1541 and the second page buffer group 1542 is configured by seven stages, each page buffer input/output unit may be arranged over two columns.

According to the embodiment of FIGS. 15 and 16, by decreasing the number of stages of each of the page buffer groups 1541 and 1542 to 7 while maintaining the number of stages of each of the cache groups 1551 and 1552 to be the same as the number of data input/output pins, the area of the page buffer circuit 1540 may be reduced while not increasing the number of data lines DL. As a result, it is possible to increase the degree of integration of a memory device. In addition, by separating the first page buffer group 1541 and the second page buffer group 1542 and disposing them at opposite sides of the cache circuit 1550, the wiring of the page lines PL may be easily carried out.

While each of the page buffer circuit 1540 and the cache circuit 1550 is divided into two groups depending on even/odd in FIGS. 15 and 16, it is to be noted that each of the page buffer circuit 1540 and the cache circuit 1550 may be divided into two groups depending on data input/output pins. Also, while it is illustrated that the first page buffer group 1541 and the second page buffer group 1542 are separated from each other and are disposed at opposite sides of the cache circuit 1550, it is to be noted that the first page buffer group 1541 and the second page buffer group 1542 may be disposed together at the same side of the cache circuit 1550.

Figure 17:
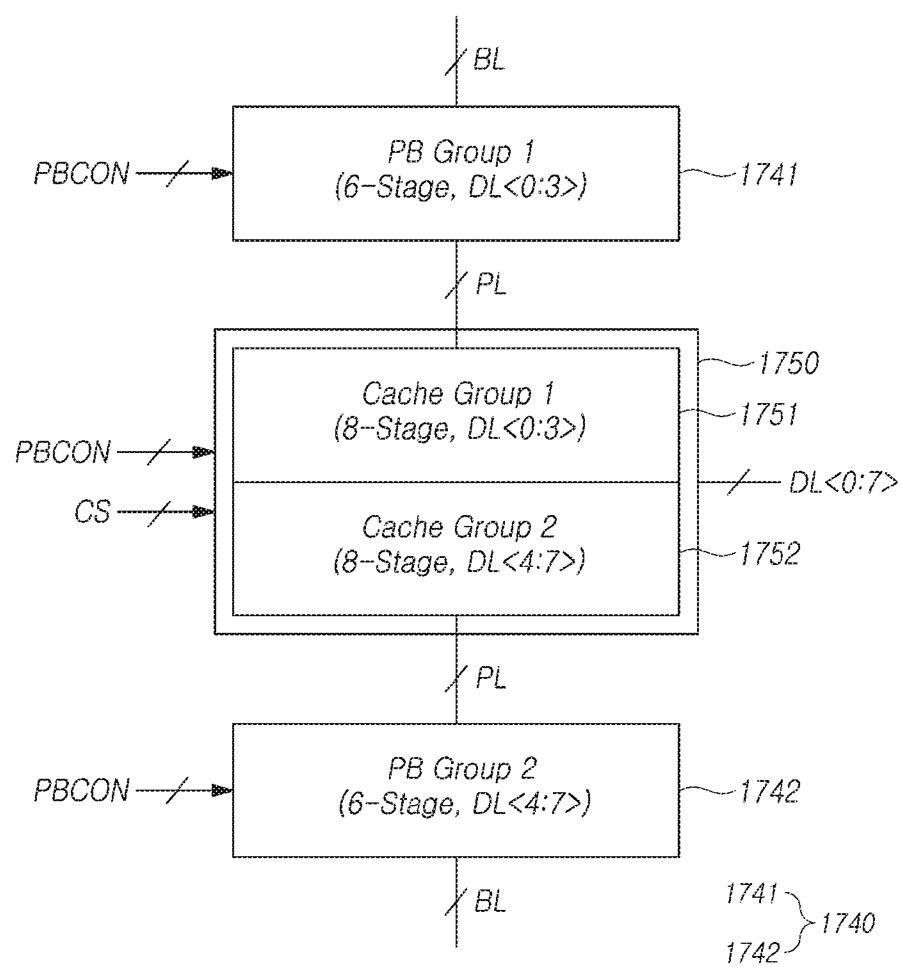
Figure 18:
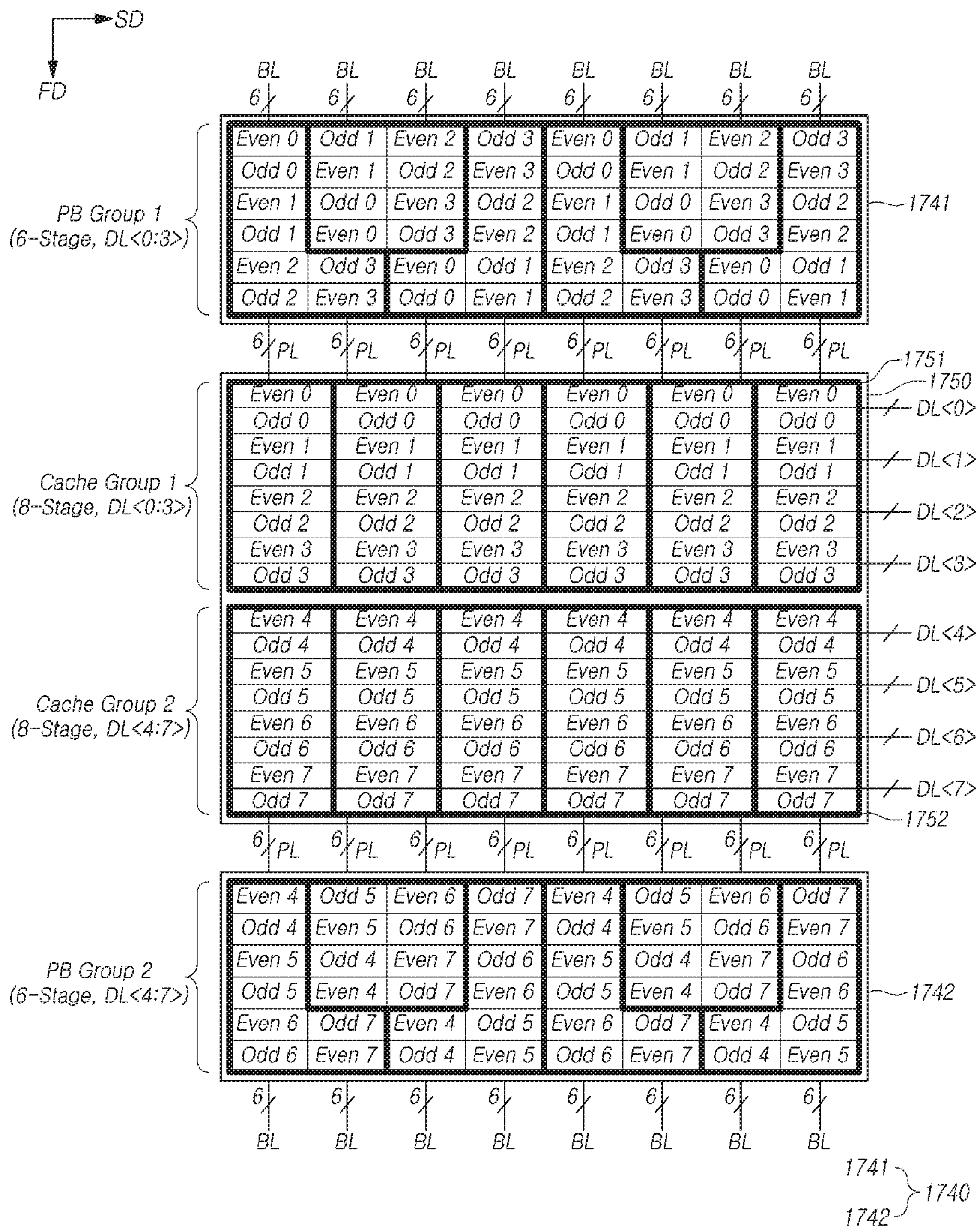

FIG. 17 is a block diagram illustrating exemplary configurations of a page buffer circuit 1740 and a cache circuit 1750 in accordance with an embodiment, and FIG. 18 is a diagram illustrating an example of the detailed layout of the page buffer circuit 1740 and the cache circuit 1750 of FIG. 17.

Referring to FIG. 17, the page buffer circuit 1740 may include a first page buffer group 1741 and a second page buffer group 1742, and the cache circuit 1750 may include a first cache group 1751 and a second cache group 1752. In the case where eight data input/output pins are used, each of the first page buffer group 1741 and the second page buffer group 1742 may be configured by six stages, and each of the first cache group 1751 and the second cache group 1752 may be configured by eight stages. The first page buffer group 1741 and the second page buffer group 1742 may be separated from each other and be disposed at opposite sides of the cache circuit 1750.

The first page buffer group 1741 and the second page buffer group 1742 may be divided depending on corresponding data input/output pins. For instance, the first page buffer group 1741 may include page buffers corresponding to first to fourth data input/output pins IO<0:3>, and the second page buffer group 1742 may include page buffers corresponding to fifth to eighth data input/output pins IO<4:7>. Similarly, the first cache group 1751 and the second cache group 1752 may also be divided depending on corresponding data input/output pins.

Referring to FIG. 18, each of the first page buffer group 1741 and the second page buffer group 1742 may include page buffers which are disposed in a matrix having six rows. The page buffers belonging to the first page buffer group 1741 may be page buffers corresponding to the first to fourth data input/output pins IO<0:3>, and the page buffers belonging to the second page buffer group 1742 may be page buffers corresponding to the fifth to eighth data input/output pins IO<4:7>.

Each of the first cache group 1751 and the second cache group 1752 may include caches which are disposed in a matrix having eight rows. For instance, the caches belonging to the first cache group 1751 may be caches corresponding to the first to fourth data input/output pins IO<0:3>, and the caches belonging to the second cache group 1752 may be caches corresponding to the fifth to eighth data input/output pins IO<4:7>. By such a layout, all of the caches belonging to two rows of the cache circuit 1750 may be coupled to the same data line DL. Thus, since one data line DL may be wired to two rows of the cache circuit 1750, wiring of data lines may be reduced.

The 96-page buffers belonging to the page buffer circuit 1740 may configure six-page buffer input/output units as indicated by the bold lines in FIG. 18. For instance, the eight-page buffers, Even 0 to 3 and Odd 0 to 3, belonging to the first page buffer group 1741 and the eight-page buffers, Even 4 to 7 and Odd 4 to 7, belonging to the second page buffer group 1742 may configure together one page buffer input/output unit. The eight caches, Even 0 to 3 and Odd 0 to 3, belonging to the first cache group 1751 and the eight caches, Even 4 to 7 and Odd 4 to 7, belonging to the second cache group 1752 may configure together one cache input/output unit. Each page buffer input/output unit may be coupled to a corresponding cache input/output unit through page lines PL. Since each of the first page buffer group 1741 and the second page buffer group 1742 is configured by six stages, each page buffer input/output unit may be arranged over two columns.

According to the embodiment of FIGS. 17 and 18, by decreasing the number of stages of each of the page buffer groups 1741 and 1742 to 6 while maintaining the number of stages of each of the cache groups 1751 and 1752 to be the same as the number of data input/output pins, the area of the page buffer circuit 1740 may be reduced while not increasing the number of data lines DL. As a result, it is possible to increase the degree of integration of a memory device. In addition, by separating the first page buffer group 1741 and the second page buffer group 1742 and disposing them at opposite sides of the cache circuit 1750, the wiring of the page lines PL may be easily carried out. Moreover, as the cache circuit 1750 is divided into two groups depending on data input/output pins, advantageously the wiring of data lines may be reduced.

While each of the page buffer circuit 1740 and the cache circuit 1750 is divided into two groups depending on data input/output pins in FIGS. 17 and 18, it is to be noted that each of the page buffer circuit 1740 and the cache circuit 1750 may be divided into two groups depending on even/odd. Also, while it is illustrated that the first page buffer group 1741 and the second page buffer group 1742 are separated from each other and are disposed at opposite sides of the cache circuit 1750, it is to be noted that the first page buffer group 1741 and the second page buffer group 1742 may be disposed together at the same side of the cache circuit 1750.

Figure 19:
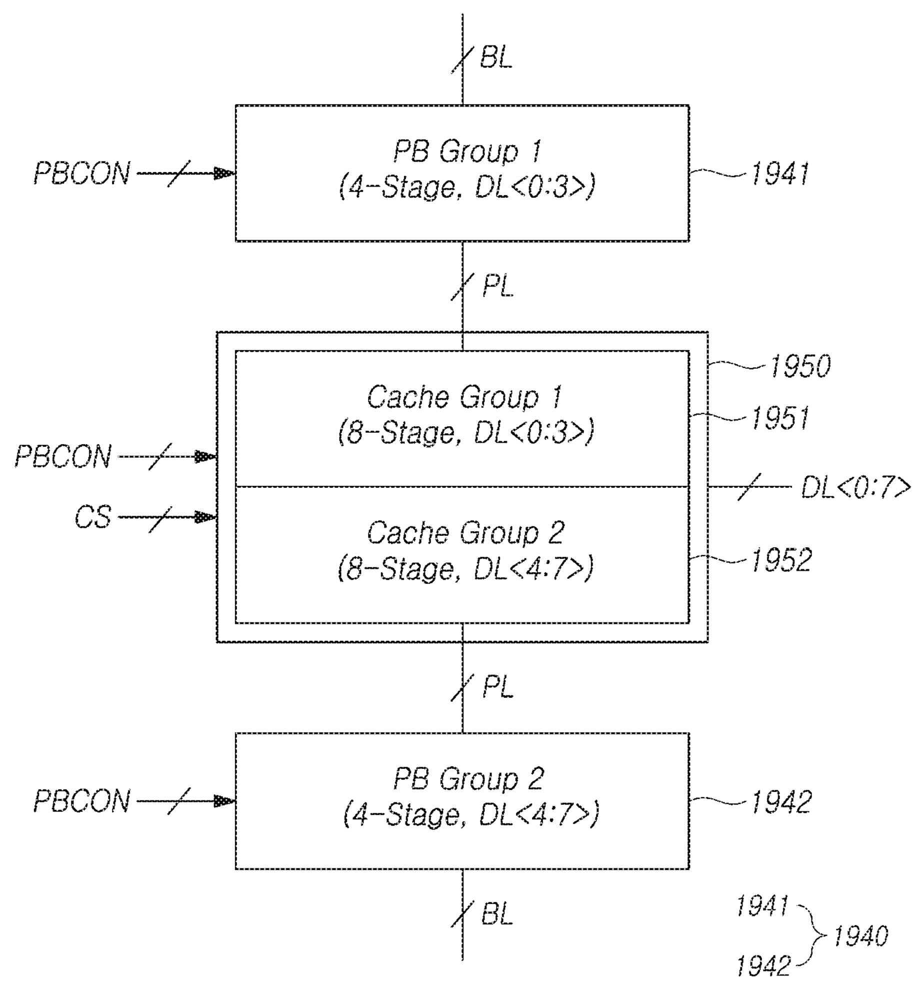
Figure 20:
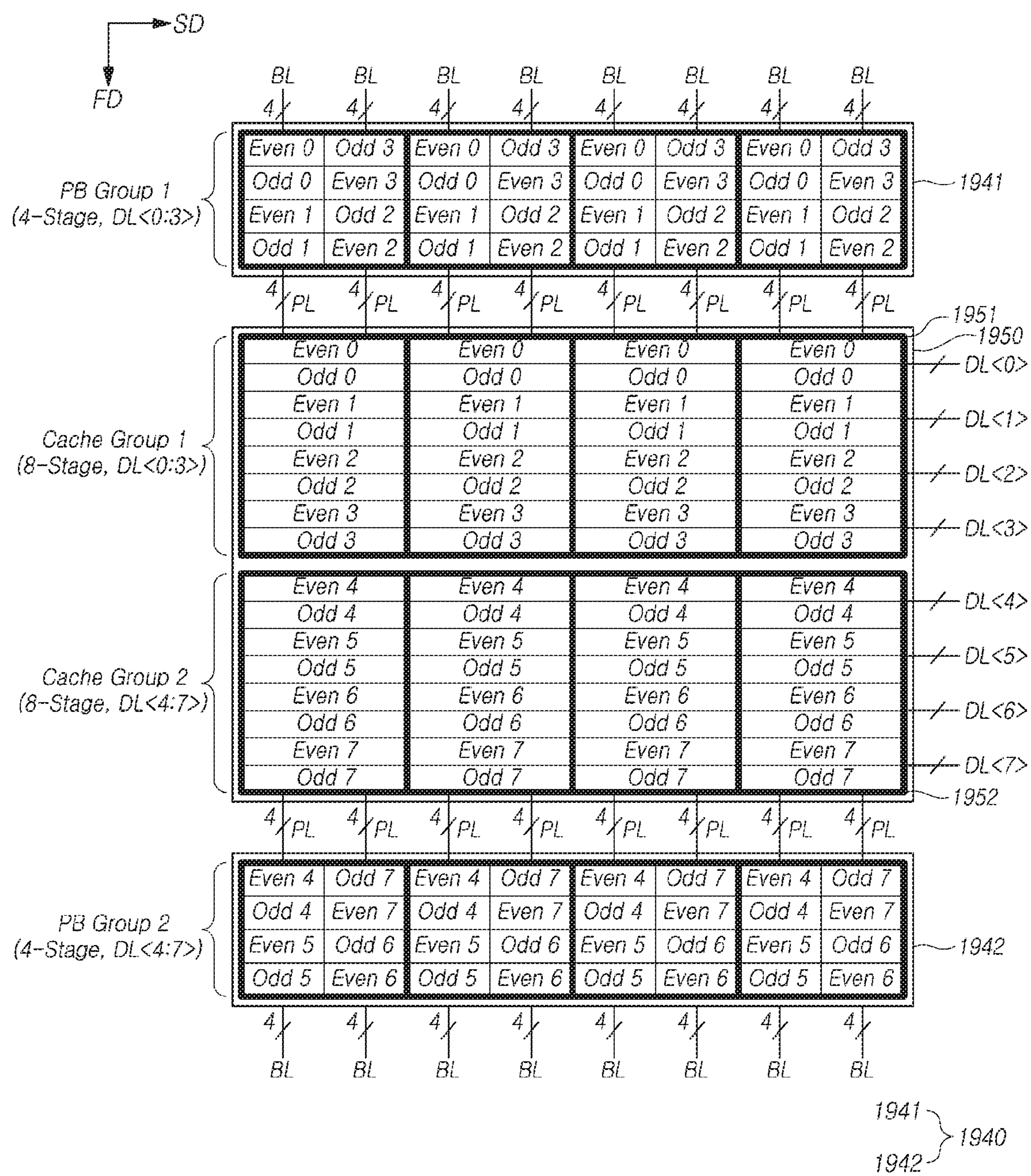

FIG. 19 is a block diagram illustrating exemplary configurations of a page buffer circuit 1940 and a cache circuit 1950 in accordance with an embodiment, and FIG. 20 is a diagram illustrating an example of the detailed layout of the page buffer circuit 1940 and the cache circuit 1950 of FIG. 19.

Referring to FIG. 19, the page buffer circuit 1940 may include a first page buffer group 1941 and a second page buffer group 1942, and the cache circuit 1950 may include a first cache group 1951 and a second cache group 1952. In the case where eight data input/output pins are used, each of the first page buffer group 1941 and the second page buffer group 1942 may be configured by four stages, and each of the first cache group 1951 and the second cache group 1952 may be configured by eight stages. The first page buffer group 1941 and the second page buffer group 1942 may be separated from each other and be disposed at opposite sides of the cache circuit 1950.

The first page buffer group 1941 and the second page buffer group 1942 may be divided depending on corresponding data input/output pins. For instance, the first page buffer group 1941 may include page buffers corresponding to first to fourth data input/output pins IO<0:3>, and the second page buffer group 1942 may include page buffers corresponding to fifth to eighth data input/output pins IO<4:7>. Similarly, the first cache group 1951 and the second cache group 1952 may also be divided depending on corresponding data input/output pins.

Referring to FIG. 20, each of the first page buffer group 1941 and the second page buffer group 1942 may include page buffers which are disposed in a matrix having four rows. The page buffers belonging to the first page buffer group 1941 may be page buffers corresponding to the first to fourth data input/output pins IO<0:3>, and the page buffers belonging to the second page buffer group 1942 may be page buffers corresponding to the fifth to eighth data input/output pins IO<4:7>.

Each of the first cache group 1951 and the second cache group 1952 may include caches which are disposed in a matrix having eight rows. For instance, the caches belonging to the first cache group 1951 may be caches corresponding to the first to fourth data input/output pins IO<0:3>, and the caches belonging to the second cache group 1952 may be caches corresponding to the fifth to eighth data input/output pins IO<4:7>. By such a layout, all of the caches belonging to two rows of the cache circuit 1950 may be coupled to the same data line DL. Thus, since one data line DL may be wired to two rows of the cache circuit 1950, wiring of data lines may be reduced.

The 64-page buffers belonging to the page buffer circuit 1940 may configure four-page buffer input/output units as indicated by the bold lines in FIG. 20. For instance, the eight-page buffers, Even 0 to 3 and Odd 0 to 3, belonging to the first page buffer group 1941 and the eight-page buffers, Even 4 to 7 and Odd 4 to 7, belonging to the second page buffer group 1942 may configure together one page buffer input/output unit. The eight caches, Even 0 to 3 and Odd 0 to 3, belonging to the first cache group 1951 and the eight caches, Even 4 to 7 and Odd 4 to 7, belonging to the second cache group 1952 may configure together one cache input/output unit. Each page buffer input/output unit may be coupled to a corresponding cache input/output unit through page lines PL. Since each of the first page buffer group 1941 and the second page buffer group 1942 is configured by four stages, each page buffer input/output unit may be arranged over two columns.

According to the embodiment of FIGS. 19 and 20, by decreasing the number of stages of each of the page buffer groups 1941 and 1942 to 4 while maintaining the number of stages of each of the cache groups 1951 and 1952 to be the same as the number of data input/output pins, the area of the page buffer circuit 1940 may be reduced while not increasing the number of data lines DL. As a result, it is possible to increase the degree of integration of a memory device. In addition, by separating the first page buffer group 1941 and the second page buffer group 1942 and disposing them at opposite sides of the cache circuit 1950, the wiring of the page lines PL may be easily carried out. Moreover, as the cache circuit 1950 is divided into two groups depending on data input/output pins, wiring of data lines may be reduced.

While each of the page buffer circuit 1940 and the cache circuit 1950 is divided into two groups depending on data input/output pins in FIGS. 19 and 20, it is to be noted that each of the page buffer circuit 1940 and the cache circuit 1950 may be divided into two groups depending on even/odd. Also, while it is illustrated that the first page buffer group 1941 and the second page buffer group 1942 are separated from each other and are disposed at opposite sides of the cache circuit 1950, it is to be noted that the first page buffer group 1941 and the second page buffer group 1942 may be disposed together at the same side of the cache circuit 1950.

Figure 21:
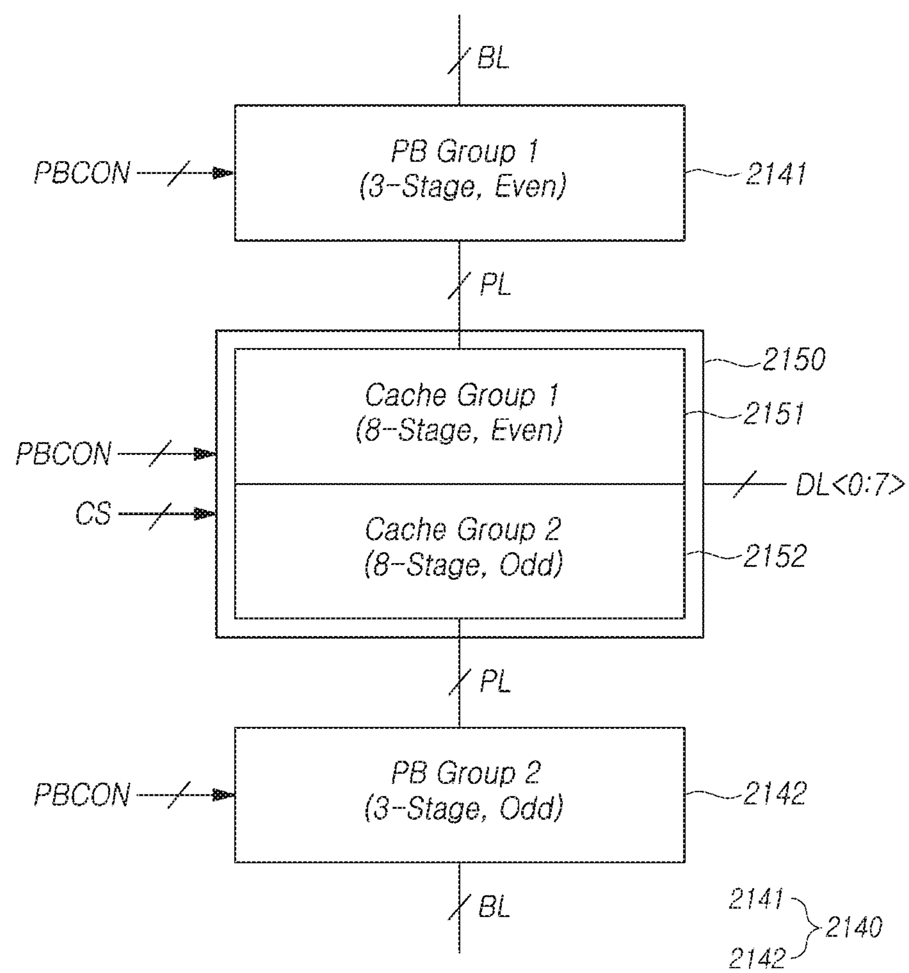

FIG. 21 is a block diagram illustrating exemplary configurations of a page buffer circuit 2140 and a cache circuit 2150 in accordance with an embodiment, and FIG. 22 is a diagram illustrating an example of the detailed layout of the page buffer circuit 2140 and the cache circuit 2150 of FIG. 21.

Referring to FIG. 21, the page buffer circuit 2140 may include a first page buffer group 2141 and a second page buffer group 2142, and the cache circuit 2150 may include a first cache group 2151 and a second cache group 2152. In the case where eight data input/output pins are used, each of the first page buffer group 2141 and the second page buffer group 2142 may be configured by three stages, and each of the first cache group 2151 and the second cache group 2152 may be configured by eight stages. The first page buffer group 2141 and the second page buffer group 2142 may be separated from each other and be disposed at opposite sides of the cache circuit 2150.

The first page buffer group 2141 and the second page buffer group 2142 may be divided depending on whether the bit lines BL coupled thereto are even or odd. For instance, the first page buffer group 2141 may include even page buffers corresponding to even bit lines, and the second page buffer group 2142 may include odd page buffers corresponding to odd bit lines. Similarly, the first cache group 2151 and the second cache group 2152 may also be divided depending on whether the types of corresponding bit lines BL are even or odd.

Referring to FIG. 22, each of the first page buffer group 2141 and the second page buffer group 2142 may include page buffers which are disposed in a matrix having three rows. The page buffers belonging to the first page buffer group 2141 may be page buffers corresponding to even bit lines BL, and the page buffers belonging to the second page buffer group 2142 may be page buffers corresponding to odd bit lines BL.

Each of the first cache group 2151 and the second cache group 2152 may include caches which are disposed in a matrix having eight rows. For instance, the caches belonging to the first cache group 2151 may be caches corresponding to even bit lines BL, and the caches belonging to the second cache group 2152 may be caches corresponding to odd bit lines BL.

The 48-page buffers belonging to the page buffer circuit 2140 may configure three-page buffer input/output units as indicated by the bold lines in FIG. 22. For instance, the eight-page buffers, Even 0 to 7, belonging to the first page buffer group 2141 and the eight-page buffers, Odd 0 to 7, belonging to the second page buffer group 2142 may configure together one page buffer input/output unit. The eight caches, Even 0 to 7, belonging to the first cache group 2151 and the eight caches, Odd 0 to 7, belonging to the second cache group 2152 may configure together one cache input/output unit. Each page buffer input/output unit may be coupled to a corresponding cache input/output unit through page lines PL. Since each of the first page buffer group 2141 and the second page buffer group 2142 is configured by three stages, each page buffer input/output unit may be arranged over three or four columns.

According to the embodiment of FIGS. 21 and 22, by decreasing the number of stages of each of the page buffer groups 2141 and 2142 to 3 while maintaining the number of stages of each of the cache groups 2151 and 2152 to be the same as the number of data input/output pins, the area of the page buffer circuit 2140 may be reduced while not increasing the number of data lines DL. As a result, it is possible to increase the degree of integration of a memory device. In addition, by separating the first page buffer group 2141 and the second page buffer group 2142 and disposing them at opposite sides of the cache circuit 2150, the wiring of the page lines PL may be easily carried out.

While each of the page buffer circuit 2140 and the cache circuit 2150 is divided into two groups depending on even/odd in FIGS. 21 and 22, it is to be noted that each of the page buffer circuit 2140 and the cache circuit 2150 may be divided into two groups depending on corresponding data input/output pins. Also, while it is illustrated that the first page buffer group 2141 and the second page buffer group 2142 are separated from each other and are disposed at opposite sides of the cache circuit 2150, it is to be noted that the first page buffer group 2141 and the second page buffer group 2142 may be disposed together at the same side of the cache circuit 2150.

Figure 23:
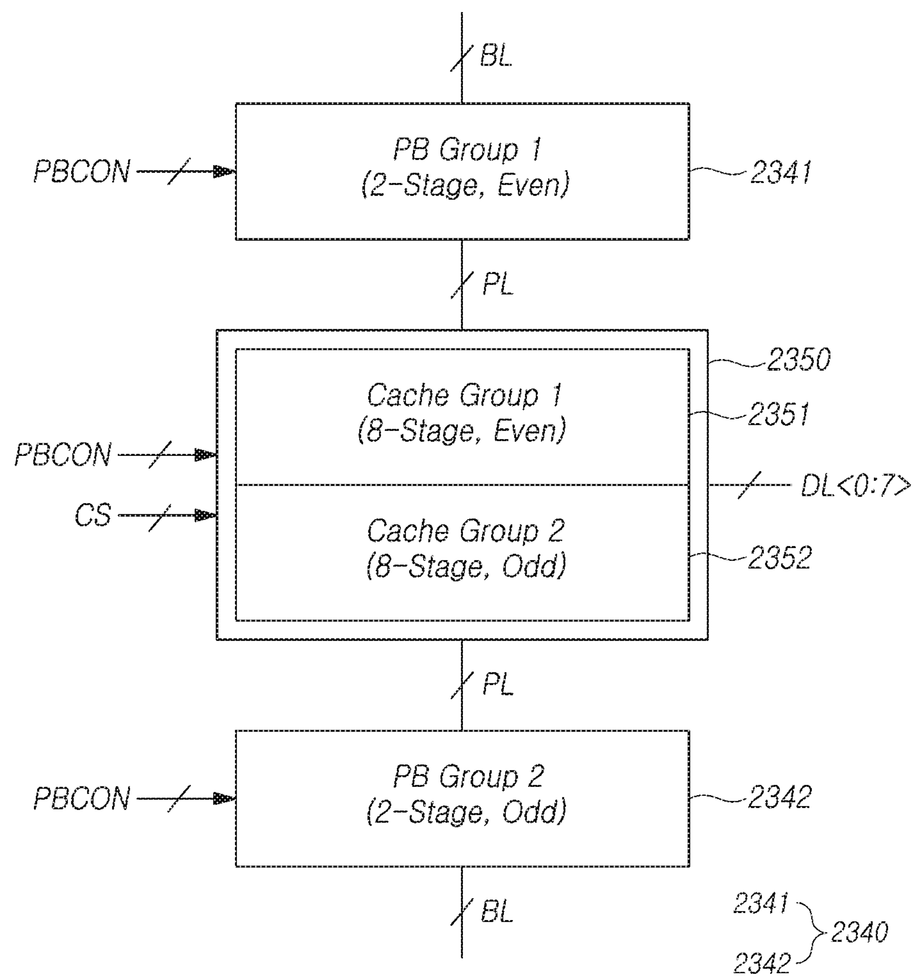
Figure 24:
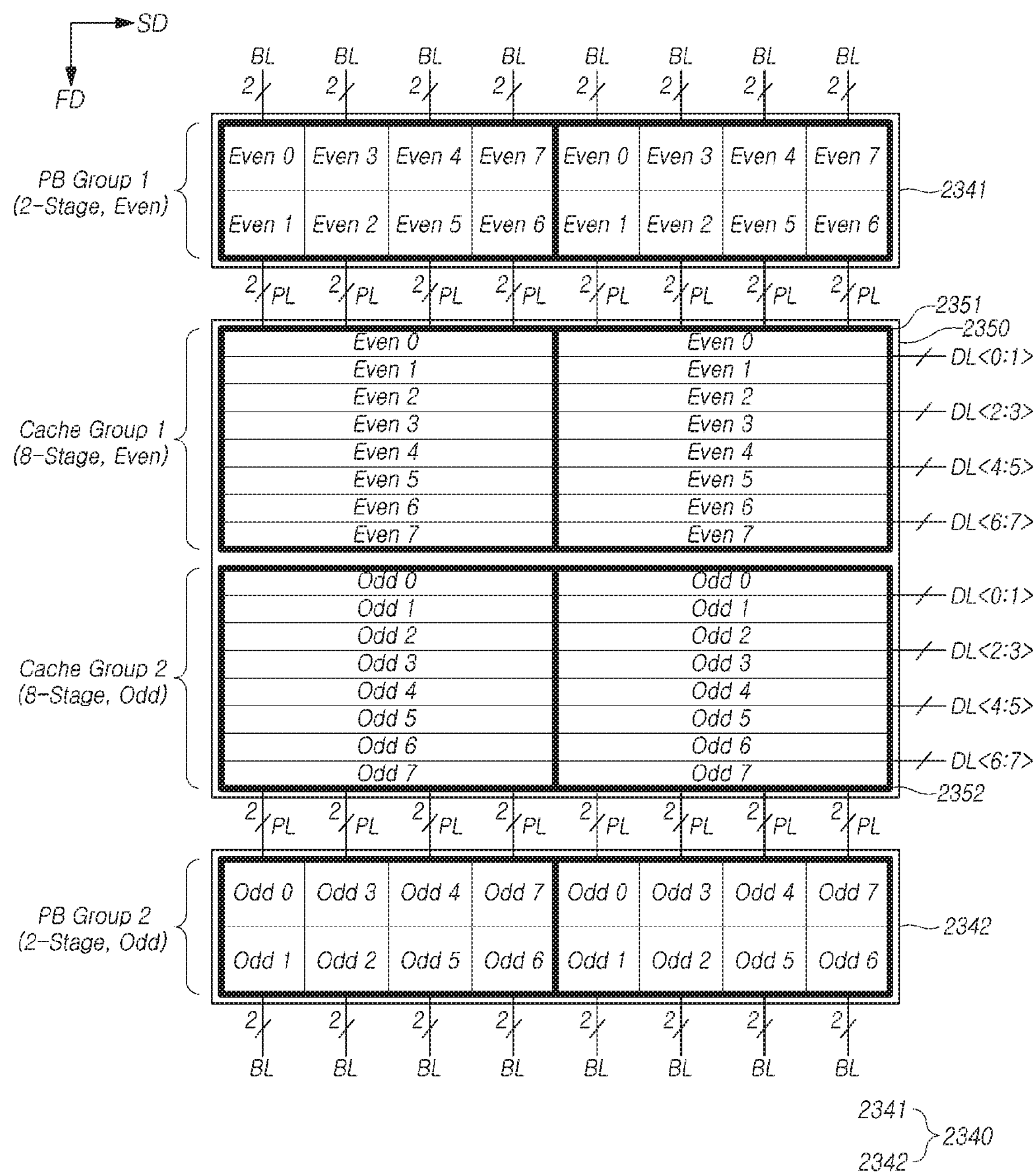

FIG. 23 is a block diagram illustrating exemplary configurations of a page buffer circuit 2340 and a cache circuit 2350 in accordance with an embodiment, and FIG. 24 is a diagram illustrating an example of the detailed layout of the page buffer circuit 2340 and the cache circuit 2350 of FIG. 23.

Referring to FIG. 23, the page buffer circuit 2340 may include a first page buffer group 2341 and a second page buffer group 2342, and the cache circuit 2350 may include a first cache group 2351 and a second cache group 2352. In the case where eight data input/output pins are used, each of the first page buffer group 2341 and the second page buffer group 2342 may be configured by two stages, and each of the first cache group 2351 and the second cache group 2352 may be configured by eight stages. The first page buffer group 2341 and the second page buffer group 2342 may be separated from each other and be disposed at opposite sides of the cache circuit 2350.

The first page buffer group 2341 and the second page buffer group 2342 may be divided depending on whether the bit lines BL coupled thereto are even or odd. For instance, the first page buffer group 2341 may include even page buffers corresponding to even bit lines, and the second page buffer group 2342 may include odd page buffers corresponding to odd bit lines. Similarly, the first cache group 2351 and the second cache group 2352 may also be divided depending on whether the types of corresponding bit lines BL are even or odd.

Referring to FIG. 24, each of the first page buffer group 2341 and the second page buffer group 2342 may include page buffers which are disposed in a matrix having two rows. The page buffers belonging to the first page buffer group 2341 may be page buffers corresponding to even bit lines BL, and the page buffers belonging to the second page buffer group 2342 may be page buffers corresponding to odd bit lines BL.

Each of the first cache group 2351 and the second cache group 2352 may include caches which are disposed in a matrix having eight rows. For instance, the caches belonging to the first cache group 2351 may be caches corresponding to even bit lines BL, and the caches belonging to the second cache group 2352 may be caches corresponding to odd bit lines BL.

The 32-page buffers belonging to the page buffer circuit 2340 may configure two-page buffer input/output units as indicated by the bold lines in FIG. 24. For instance, the eight-page buffers, Even 0 to 7, belonging to the first page buffer group 2341 and the eight-page buffers, Odd 0 to 7, belonging to the second page buffer group 2342 may configure together one page buffer input/output unit. The eight caches, Even 0 to 7, belonging to the first cache group 2351 and the eight caches, Odd 0 to 7, belonging to the second cache group 2352 may configure together one cache input/output unit. Each page buffer input/output unit may be coupled to a corresponding cache input/output unit through page lines PL. Since each of the first page buffer group 2341 and the second page buffer group 2342 is configured by two stages, each page buffer input/output unit may be arranged over four columns.

According to the embodiment of FIGS. 23 and 24, by decreasing the number of stages of each of the page buffer groups 2341 and 2342 to 2 while maintaining the number of stages of each of the cache groups 2351 and 2352 to be the same as the number of data input/output pins, the area of the page buffer circuit 2340 may be reduced while not increasing the number of data lines DL. As a result, it is possible to increase the degree of integration of a memory device. In addition, by separating the first page buffer group 2341 and the second page buffer group 2342 and disposing them at opposite sides of the cache circuit 2350, the wiring of the page lines PL may be easily carried out.

While each of the page buffer circuit 2340 and the cache circuit 2350 is divided into two groups depending on even/odd in FIGS. 23 and 24, it is to be noted that each of the page buffer circuit 2340 and the cache circuit 2350 may be divided into two groups depending on data input/output pins. Also, while it is illustrated that the first page buffer group 2341 and the second page buffer group 2342 are separated from each other and are disposed at opposite sides of the cache circuit 2350, it is to be noted that the first page buffer group 2341 and the second page buffer group 2342 may be disposed together at the same side of the cache circuit 2350.

Various embodiments of configurations of a page buffer circuit and a cache circuit are described above. However, various modifications are possible.

In the above-described embodiments, even though the numbers of page buffers are different, the widths (i.e., the lengths in a second direction SD) of page buffer circuits are shown to be similar. For example, the width of the page buffer circuit 1940 including 64-page buffers in FIG. 20 and the width of the page buffer circuit 2340 including 32-page buffers in FIG. 24 are shown to be similar to each other. However, this is only an example; the width of a page buffer circuit may be substantially proportional to the number of corresponding bit lines. For example, since the page buffer circuit 1940 of FIG. 20 corresponds to 64-bit lines and the page buffer circuit 2340 of FIG. 24 corresponds to 32-bit lines, the page buffer circuit 1940 of FIG. 20 may be formed to have a width approximately two times larger than the page buffer circuit 2340 of FIG. 24. In this case, since the width of an entire page buffer circuit may be equal to or similar to the width of an entire memory cell array, it seems that the widths of the entire page buffer circuits in the above-described embodiments are substantially the same.

Next, with reference to FIGS. 25 to 31, bit line contacts and data lines capable of being applied to the above-described embodiments are described.

Figure 25:
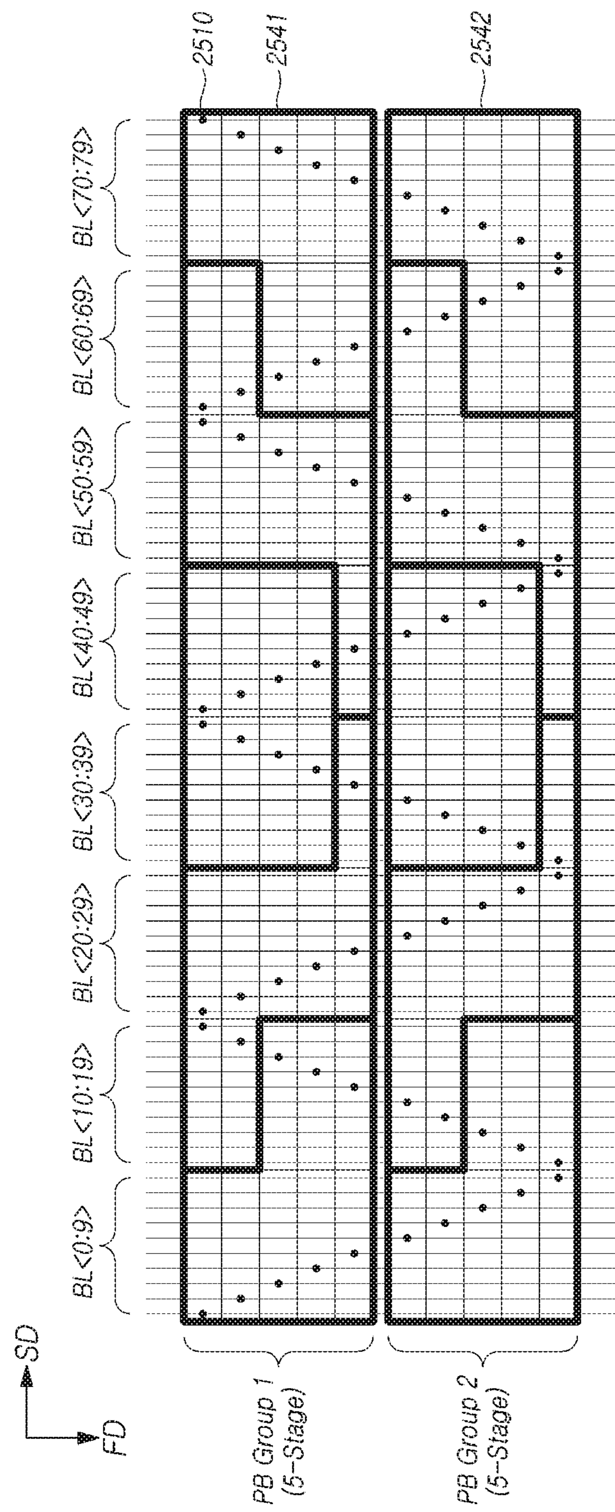
FIG. 25 is a diagram illustrating an example of the layout of bit line contacts in a page buffer circuit.

FIG. 25 is a diagram illustrating an example of the layout of bit line contacts in a page buffer circuit.

Referring to FIG. 25, each of a first page buffer group 2541 and a second page buffer group 2542 may include page buffers which are arranged in a matrix having five rows. Ten-bit lines BL may be provided for each column of the first page buffer group 2541 and second page buffer group 2542. Each of the page buffers belonging to each column of the first page buffer group 2541 and second page buffer group 2542 may be electrically coupled with one bit line. To this end, page buffers may be coupled to bit lines BL through bit line contacts 2510, respectively.

For instance, the bit line contacts 2510 may be disposed in a diagonal direction in one column. That is to say, as the page buffers go downwards in a first direction FD as in the first column, the bit line contacts 2510 may be respectively disposed at positions that are gradually away in a second direction SD. Also, as the page buffers go upwards in the opposite direction of the first direction FD as in the second column, the bit line contacts 2510 may be respectively disposed at positions that are gradually away in the second direction SD. In the case where the bit line contacts 2510 repeat the layout pattern of the first column and the second column, it may be mentioned that the bit line contacts 2510 have a V-shaped layout. The V-shaped layout may be two adjacent bit lines BL respectively coupled to two-page buffers which are adjacent to each other in the bit line direction.

Figure 26:
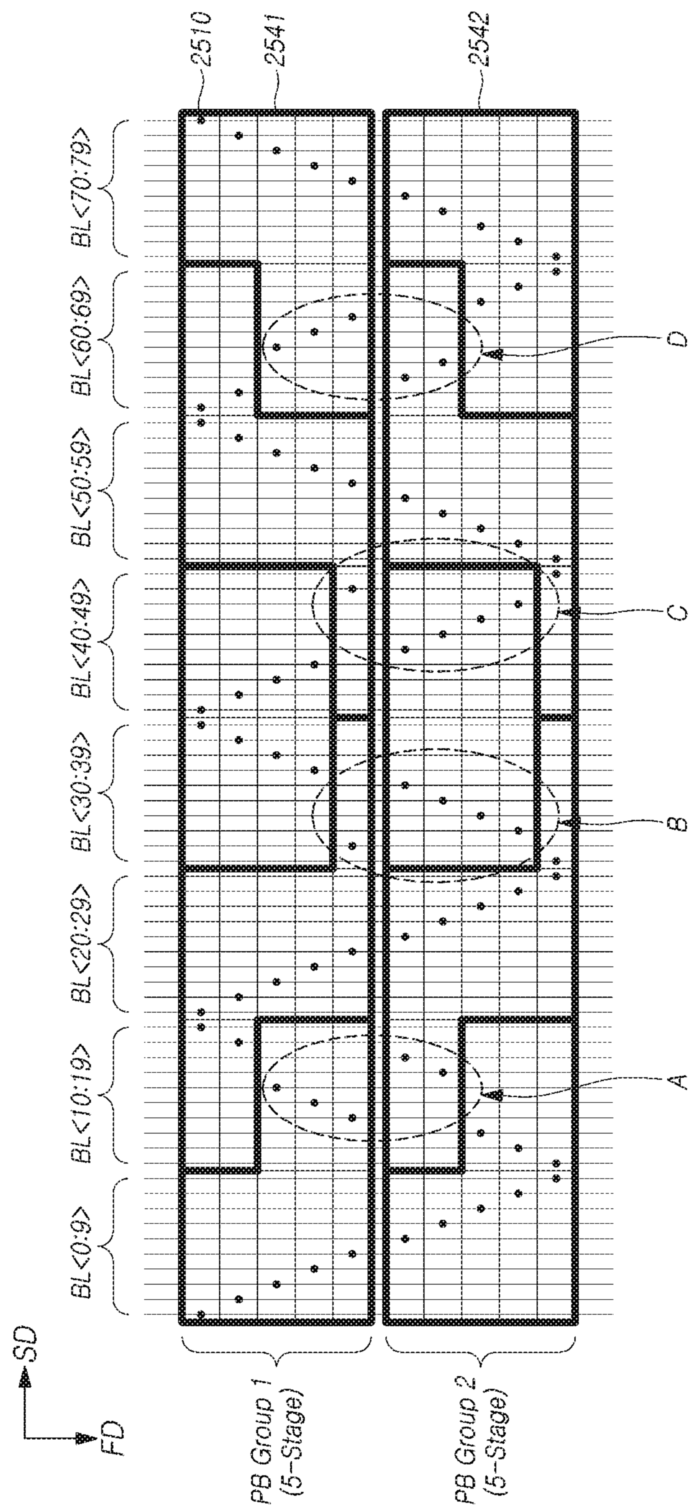
FIG. 26 is a diagram illustrating an example of the layout of bit line contacts in a page buffer circuit.

FIG. 26 is a diagram illustrating an example of the layout of bit line contacts in a page buffer circuit.

Referring to FIG. 26, while the layout of a first page buffer group 2541 and a second page buffer group 2542 is the same as in FIG. 25, a difference from FIG. 25 exists in that the positions of bit line contacts 2510 are changed in some page buffers. Portions where the positions of the bit line contacts 2510 are changed are marked by dotted ellipses A, B, C and D in the figure.

Figure 27:
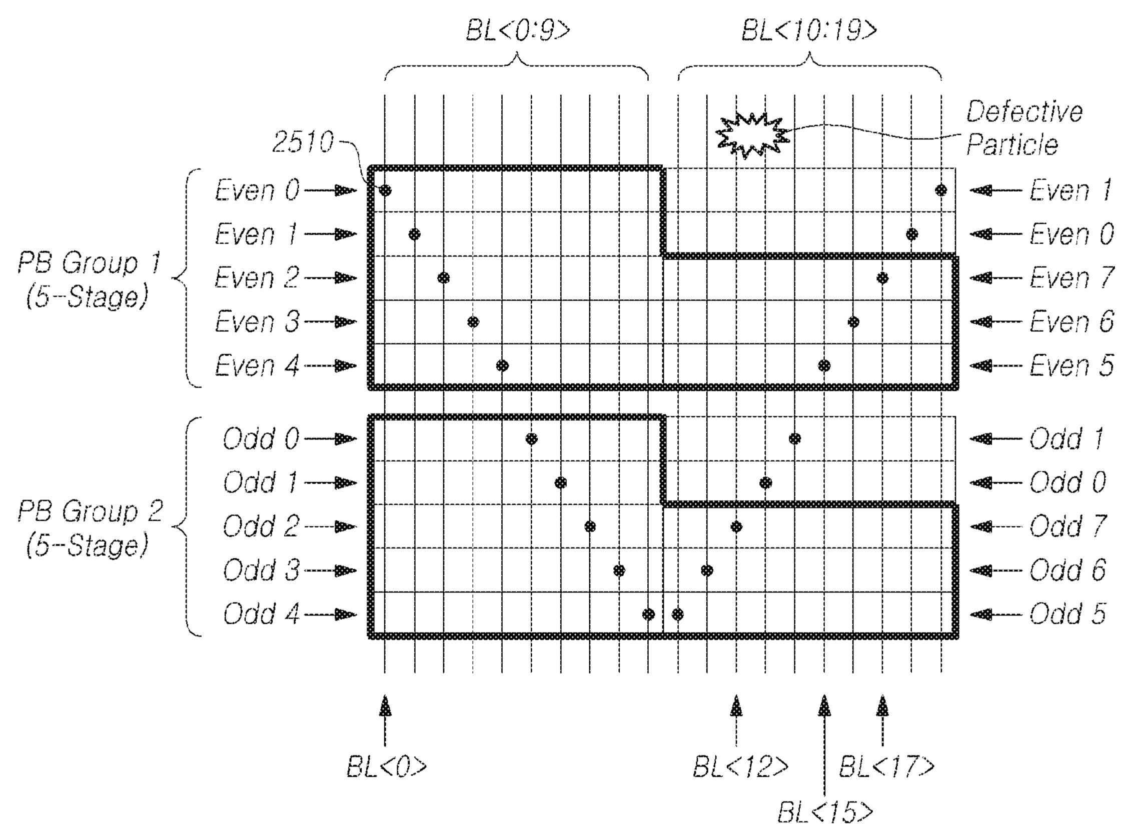
FIG. 27 is a diagram to assist in the explanation of the influence of a defective particle according to the layout of bit line contacts, by enlarging a portion of FIG. 25.
Figure 28:
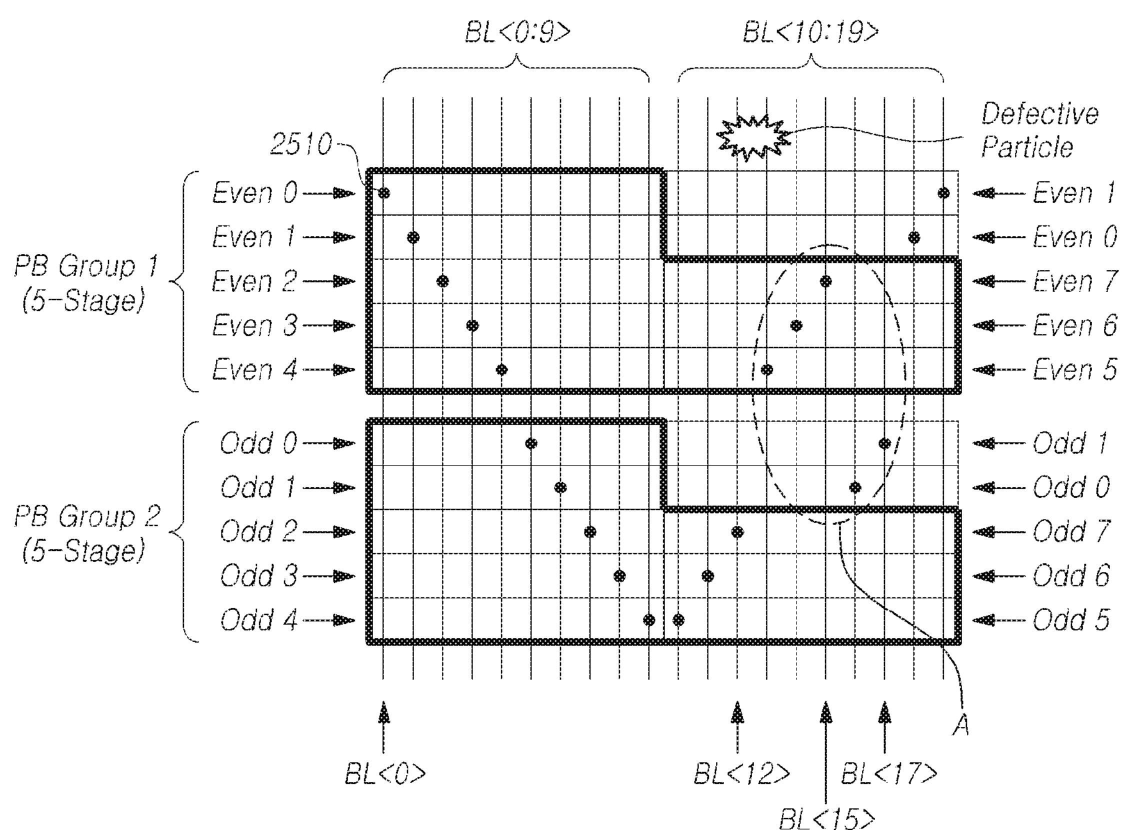
FIG. 28 is a diagram to assist in the explanation of the influence of a defective particle according to the layout of bit line contacts, by enlarging a portion of FIG. 26.

The reason why the positions of the bit line contacts 2510 are changed in FIG. 26 will be described below with reference to FIGS. 27 and 28. FIG. 27 is an enlarged view of two columns of FIG. 25, and FIG. 28 is an enlarged view of two columns of FIG. 26.

In FIG. 27, the bit line contacts 2510 are disposed in a V pattern. As mentioned, the eight-page buffers, Even 0 to Even 7, of the first page buffer group (PB Group 1) and the eight-page buffers, Odd 0 to Odd 7, of the second page buffer group (PB Group 2) may configure together one page buffer input/output unit as indicated by the bold lines. Observing bit lines BL corresponding to the page buffer input/output unit, it may be seen that bit lines BL<0> to BL<12> and BL<15> to BL<17> correspond to the page buffer input/output unit. In this way, in the case where the bit line contacts 2510 are disposed in the V pattern, 16-bit lines (bit line input/output unit) corresponding to one page buffer input/output unit may not be disposed continuously to one another. Such a phenomenon may occur when the number of stages of a page buffer group is smaller than the number of data input/output pins.

In a memory device, a failure may occur in a bit line by a defective particle in a manufacturing process or the like. In this case, an operation error may occur, and this problem may be alleviated by column repair that replaces a failed column with a normal column to allow a normal operation to be performed. As the distance between bit lines narrows due to fine processing, the frequency of which a defective particle exerts influence on multiple bit lines increases. In this regard, in order to increase the efficiency of repair, it is the norm that repair is performed by an input/output unit. For example, in the case where eight data input/output pins are used, column repair may be performed by grouping 16-bit lines into one unit. In other words, if a failure occurs even in any one among the 16-bit lines configuring one input/output unit, the entire input/output unit may be processed as a failure and may be replaced with a normal input/output unit.

As described above with reference to FIG. 27, in the case where the 16-bit lines belonging to one bit line input/output unit are not continuously disposed, it is highly likely that a defective particle which has occurred at the boundary of different bit line input/output units may cause failures in both of the two-bit line input/output units. For example, in the case where a defective particle occurs over the bit lines BL<12> and BL<13> as shown in FIG. 27, because the bit lines BL<12> and BL<13> belong to different bit line input/output units, both of the two-bit line input/output units should be processed as failures. In this case, the efficiency of column repair may deteriorate. Namely, in the case where the bit lines belonging to the same bit line input/output unit are not disposed continuously, it is highly likely that failures may simultaneously occur in two-bit line input/output units by a defective particle.

FIG. 28 is an enlarged view of two columns of FIG. 26, and is different from FIG. 27 in that the positions of the bit line contacts 2510 are changed at the portion indicated by the dotted ellipse A. For instance, the bit line contacts 2510 of the third to fifth rows of the second column are formed first, and then the bit line contacts 2510 of the sixth and seventh rows of the second column are formed. Due to this arrangement, bit lines BL corresponding to the page buffer input/output unit indicated by the bold lines may be the bit lines BL<0> to BL<15> and thus may be disposed continuously to one another. That is to say, in the embodiment of FIG. 26, through a layout in which two-bit lines respectively coupled to two-page buffers adjacent to each other in a bit line direction (i.e., the first direction FD) are disposed so as not to be adjacent to each other in a certain region, bit lines configuring one input/output unit may be disposed continuously to one another. In this case, even though a defective particle occurs over the bit lines BL<12> and BL<13> in the same manner as shown in FIG. 27, since the two-bit lines belong to the same input/output unit, only one input/output unit may be processed as a failure.

Figure 29:
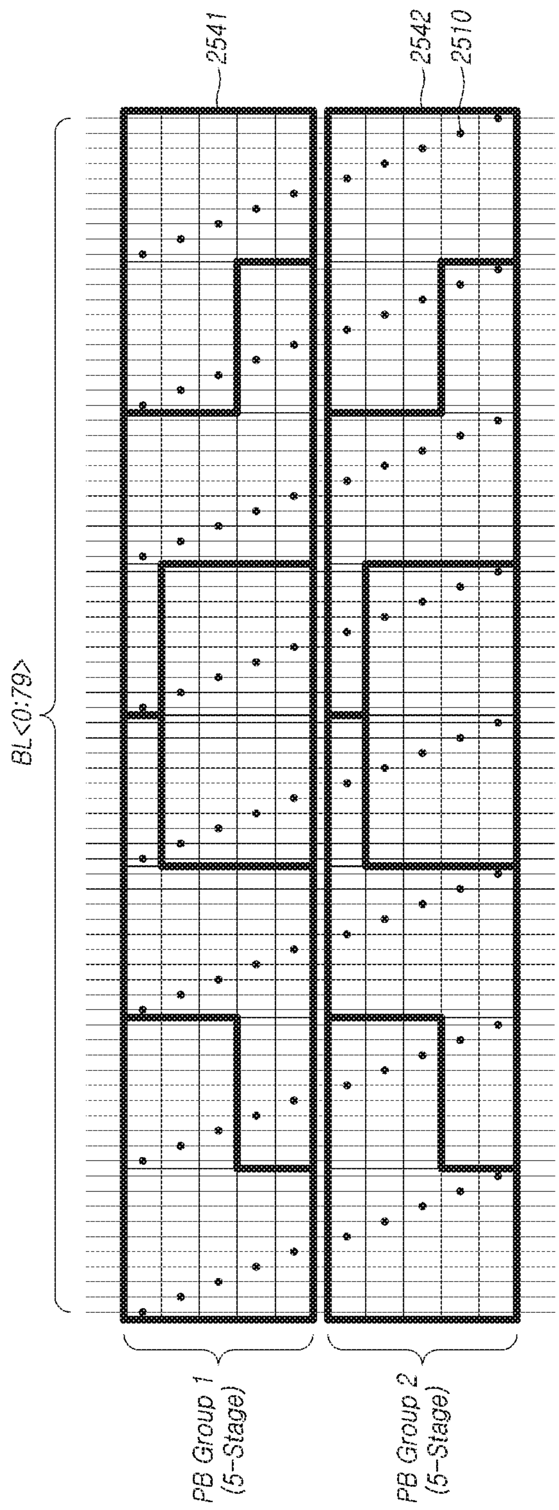
FIG. 29 is a diagram illustrating an example of the layout of bit line contacts in a page buffer circuit.

FIG. 29 is a diagram illustrating an example of the layout of bit line contacts in a page buffer circuit.

Referring to FIG. 29, bit line contacts 2510 may be disposed in the same diagonal direction pattern in all columns. Such a layout of the bit line contacts 2510 may be defined as a layout of a single diagonal direction pattern. The layout of the single diagonal direction pattern may also be understood as that two-bit lines BL, respectively coupled to two-page buffers which are adjacent to each other in the bit line direction (i.e., the first direction FD), are disposed to be adjacent to each other.

By the single diagonal direction layout of the bit line contacts 2510, bit line contacts 2510 in the same row (that is, the same stage) may be disposed so as not to be adjacent to each other. As the degree of integration of a memory device increases, the distance between bit lines gradually narrows. In this situation, in the case where two-bit line contacts 2510 are adjacent to each other in the same row (see columns of the tenth row in FIG. 25), the probability of a failure in which two-bit line contacts 2510 are short-circuited increases. In the case where bit line contacts 2510 are disposed in the single diagonal direction pattern, failures in which bit line contacts 2510 are short-circuited may be decreased.

Figure 30:
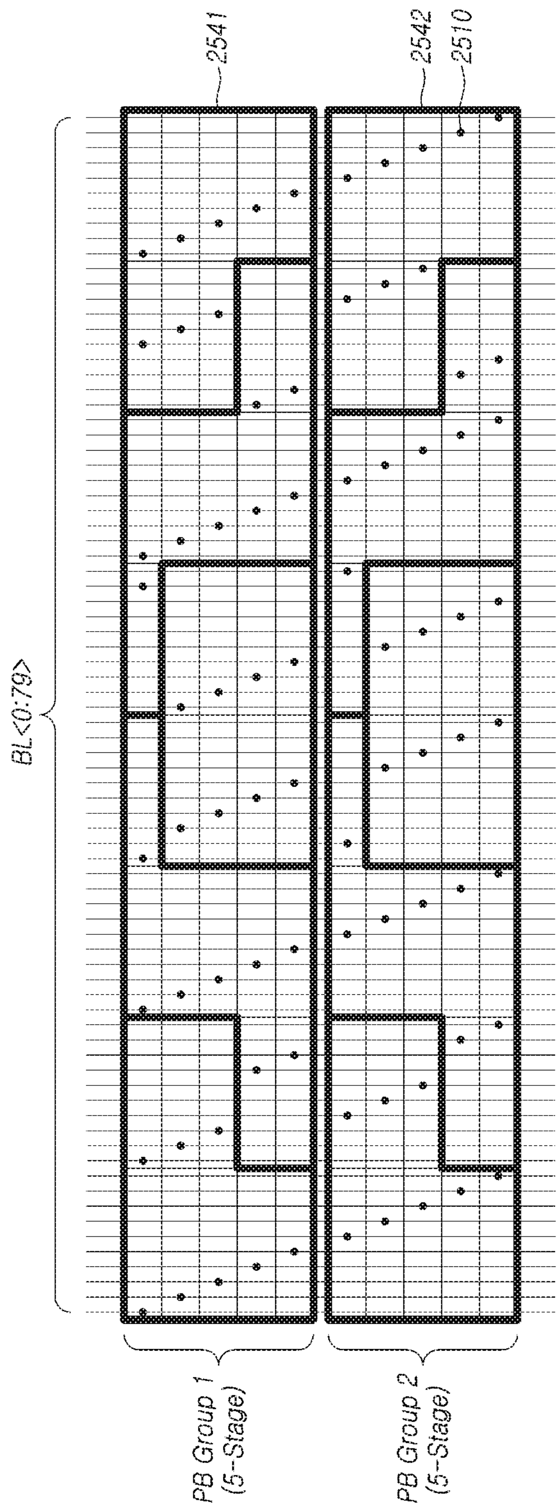
FIG. 30 is a diagram illustrating an example of the layout of bit line contacts in a page buffer circuit.

FIG. 30 is a diagram illustrating an example of the layout of bit line contacts in a page buffer circuit.

Referring to FIG. 30, bit line contacts 2510 are disposed in a single diagonal direction pattern as shown in FIG. 29, and the layout of some bit line contacts 2510 is changed such that the bit lines BL belonging to the same input/output unit may be disposed continuously to one another as shown in FIG. 26. According to the embodiment of FIG. 30, not only failures in which two-bit line contacts 2510 are short-circuited may be decreased, but also the efficiency of column repair may be improved.

Figure 31:
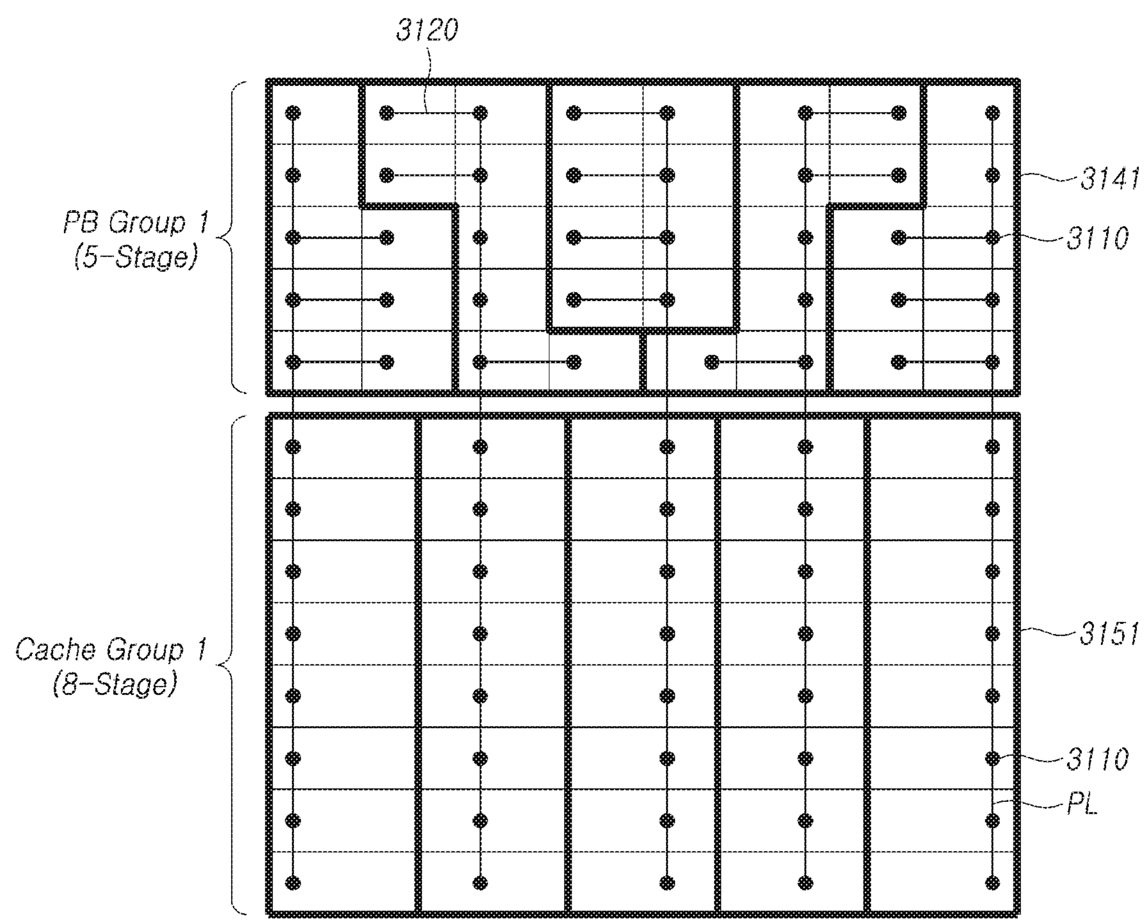
FIG. 31 is a diagram illustrating an example of page lines which couple page buffers and caches.

FIG. 31 is a diagram illustrating an example of page lines which couple a page buffer circuit and a cache circuit.

Referring to FIG. 31, a first page buffer group 3141 and a first cache group 3151 may be coupled with each other through page lines PL. The page lines PL may be coupled with respective page buffers and caches through page line contacts 3110.

As mentioned, in the case where eight data input/output pins are used, the eight-page buffers belonging to one input/output unit in the first page buffer group 3141 may be coupled with the eight caches belonging to one input/output unit in the first cache group 3151. As one method for coupling the eight-page buffers and the eight caches, the respective page buffers may be coupled to the respective caches by using dedicated page lines (not shown). However, in the case of this method, the number of page lines increases, which is a disadvantage. As another method, as shown in FIG. 31, eight-page buffers may be coupled to eight caches while sharing one page line PL. In this case, each page buffer may include therein a switching element capable of selectively performing coupling with and decoupling from the page line PL. In the same manner, each cache may also include therein a switching element capable of selectively performing coupling with and decoupling from the page line PL. In the case where the page line PL is shared in this method, the number of page lines PL may be decreased.

In the case where the number of stages of each page buffer group is less than the number of data input/output pins as described above, the page buffers belonging to one input/output unit may belong to at least two columns. For instance, in the case where the first page buffer group 3141 shares page lines PL while having five stages as shown in FIG. 31, some page buffers among the eight-page buffers belonging to one input/output unit may be positioned in a column where no page line PL is disposed. That is to say, a page line PL may not pass through the regions of some page buffers. Therefore, in the case of a page buffer through the region of which a page line PL does not pass, it is necessary to couple the page buffer to a page line PL by using a separate means.

To this end, among the page buffers belonging to one page buffer input/output unit, the page buffers positioned in a column where a page line is not disposed may be coupled to a page line PL via adjacent page buffers through page coupling lines 3120. In this regard, since the number of wiring lines increases if separate wiring lines are used to form the page coupling lines 3120, the page coupling lines 3120 may be formed by utilizing the structure already existing in the page buffers. For instance, the page coupling lines 3120 may be formed in a semiconductor layer or a gate layer which is used to implement a page buffer circuit.

Figure 32:
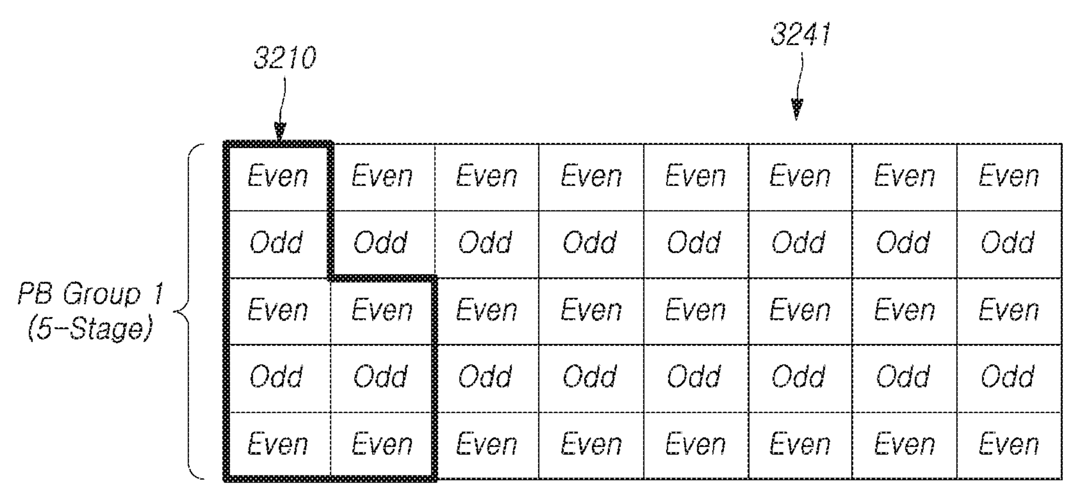
FIG. 32 is a diagram illustrating an example of the layout of page buffers in a page buffer group.

FIG. 32 is a diagram illustrating an example of the layout of page buffers in a page buffer group.

Referring to FIG. 32, a first page buffer group 3241 may include page buffers which are arranged in a matrix having five rows. As described above, in the case where a page buffer circuit is divided into two groups depending on data input/output pins, even page buffers and odd page buffers may be disposed together in the first page buffer group 3241. Further, even in one page buffer input/output unit 3210 which includes eight-page buffers, there may be disposed together even page buffers and odd page buffers.

In the case where each row of the first page buffer group 3241 is configured by any one type of even page buffers or odd page buffers, as five even page buffers and three odd page buffers are included in one page buffer input/output unit 3210, the numbers of even page buffers and odd page buffers may not correspond to each other. Such a layout may be caused when each page buffer group is configured by an odd number of stages.

FIG. 33 is a diagram illustrating an example of the layout of page buffers in a page buffer group.

Referring to FIG. 33, while each of four rows (e.g., first to fourth rows) of a first page buffer group 3341 includes one type of even page buffers or odd page buffers, even page buffers and odd page buffers may be disposed together in any one row (e.g., a fifth row). That is to say, even page buffers and odd page buffers may be disposed together in at least any one stage of a page buffer circuit. In this case, the same numbers of even page buffers and odd page buffers may be included in one page buffer input/output unit 3310. Namely, even in the case where the first page buffer group 3341 is configured by an odd number of stages, the numbers of even page buffers and odd page buffers may be made equal in the page buffer input/output unit 3310.

Figure 34B:
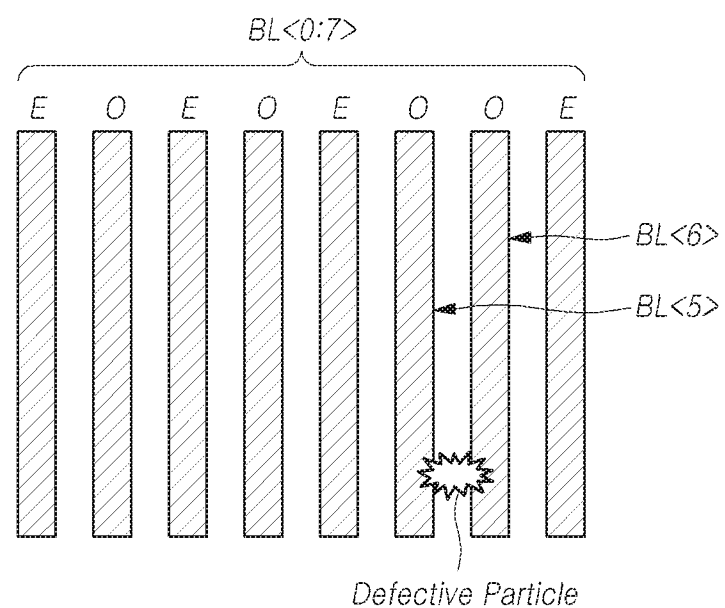

FIGS. 34A and 34B are diagrams to assist in the explanation of the influence of a defective particle for the layout of page buffers shown in FIG. 33.

In FIG. 34A, the bit lines coupled to the page buffer input/output unit 3310 shown in FIG. 33 are exemplarily allocated. For example, bit lines BL<0> to BL<4> may be sequentially allocated to the page buffers of the first row to the fifth row of the first column in a downward direction, and bit lines BL<5> to BL<7> may be allocated to the page buffers of the third row to the fifth row of the second column in reverse order. According to this scheme, as shown in FIG. 34B, the odd bit lines BL<5> and BL<6> may be continuously disposed. In such a bit line layout, in the case where a defective particle short-circuits the bit lines BL<5> and BL<6>, a bit line failure may not be detected.

As a method of detecting a bit line failure, a short circuit between two adjacent bit lines may be detected by applying potential difference between an odd bit line BL and an even bit line BL and then detecting whether current flows or not. In the case where odd bit lines or even bit lines are continuously disposed as shown in FIG. 34B, since current does not flow between the same type of bit lines even though a defective particle occurs, a failure may not be detected.

Figure 35B:
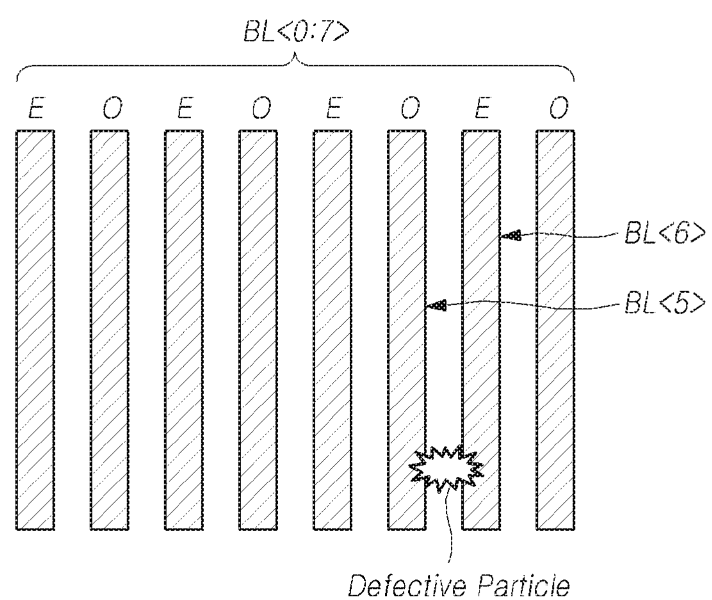

FIGS. 35A and 35B are diagrams illustrating an example of the layout of page buffers in a page buffer group.

Referring to FIGS. 35A and 35B, even page buffers and odd page buffers may be disposed together in all the rows of a first page buffer group 3541. For instance, in the first page buffer group 3541, even page buffers and odd page buffers may be alternately disposed in all rows. Also, for instance, in the first page buffer group 3541, even page buffers and odd page buffers may be alternately disposed in all rows and columns. By this layout, even in the case where the first page buffer group 3541 is configured by an odd number of stages, the numbers of even page buffers and odd page buffers may be made equal in a page buffer input/output unit 3510. Moreover, even in the case of allocating bit lines in the same manner as in FIG. 34A, since even bit lines and odd bit lines are arranged alternately with each other as shown in FIG. 35B, no problem is caused in detecting a bit line failure.

With reference to FIGS. 25 to 35B, the even/odd layouts of bit line contacts, page lines and page buffers were described. While it is illustrated in FIGS. 25 to 35B that a page buffer group has five stages, the present disclosure is not limited thereto, and may include a case where a page buffer group has a different number of stages.

Figure 36:
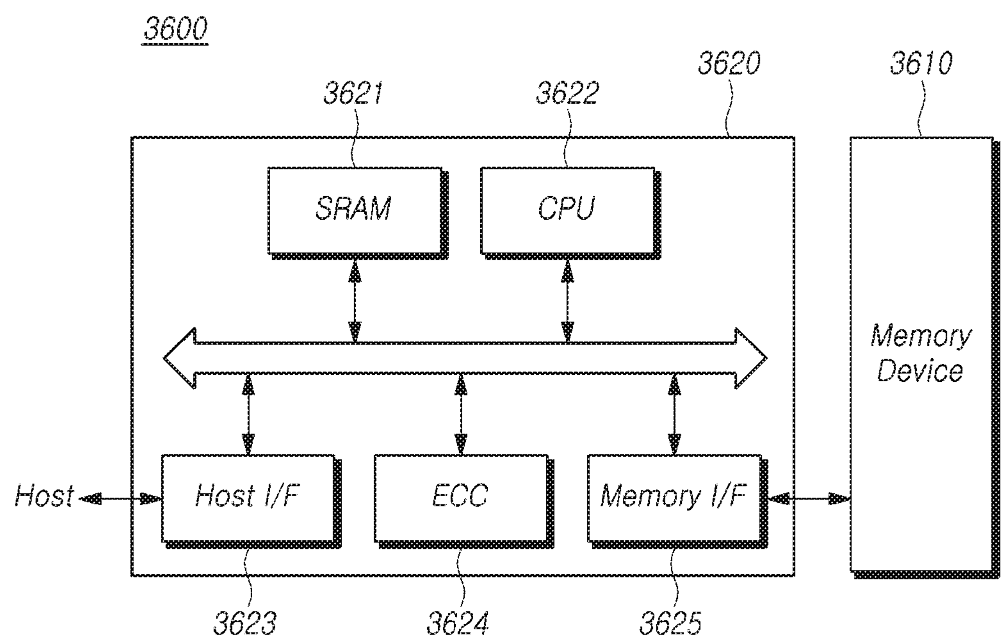
FIG. 36 is a simplified block diagram schematically illustrating a memory system including a memory device in accordance with an embodiment.

FIG. 36 is a simplified block diagram schematically illustrating a memory system including a memory device in accordance with an embodiment.

Referring to FIG. 36, a memory system 3600 may include a nonvolatile memory device 3610 and a memory controller 3620.

The nonvolatile memory device 3610 may be configured by the memory device described above and may operate in the manner described above. The memory controller 3620 may be configured to control the nonvolatile memory device 3610. By the combination of the nonvolatile memory device 3610 and the memory controller 3620, a memory card or a solid state disk (SSD) may be provided.

An SRAM 3621 may be used as the working memory of a processing unit (CPU) 3622. A host interface 3623 may include the data exchange protocol of a host which is coupled with the memory system 3600. An error correction block 3624 may detect and correct an error included in the data read from the nonvolatile memory device 3610. A memory interface 3625 may interface with the nonvolatile memory device 3610. The processing unit 3622 may perform general control operations for data exchange of the memory controller 3620.

Although not shown in the drawing, it is understood that the memory system 3600 may be additionally provided with a ROM which stores code data for interfacing with the host. The nonvolatile memory device 3610 may be provided as a multi-chip package which is configured by a plurality of flash memory chips.

The memory system 3600 in accordance with embodiments, described above, may be implemented as a storage medium of high reliability, in which the probability of an error occurring is low. In particular, the aforementioned memory device may be provided for a memory system such as a solid state disk (SSD). In this case, the memory controller 3620 may be configured to communicate with an external device (for example, the host) through one of various interface protocols such as a USB (universal serial bus) protocol, an MMC (multimedia card) protocol, a PCI-E (peripheral component interconnection express) protocol, an SATA (serial advanced technology attachment) protocol, a PATA (parallel advanced technology attachment) protocol, an SCSI (small computer system interface) protocol, an ESDI (enhanced small disk interface) protocol and an IDE (Integrated Device Electronics) protocol.

Figure 37:
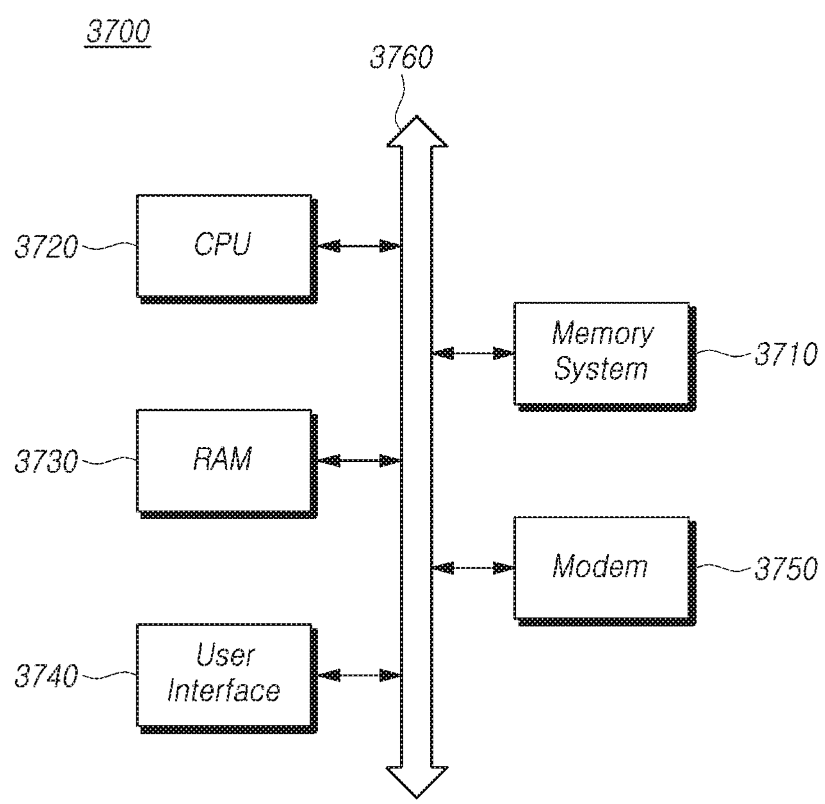
FIG. 37 is a simplified block diagram schematically illustrating a computing system including a memory device in accordance with an embodiment.

FIG. 37 is a simplified block diagram schematically illustrating a computing system including a memory device in accordance with an embodiment.

Referring to FIG. 37, a computing system 3700 may include a memory system 3710, a microprocessor 3720, a RAM 3730, a user interface 3740 and a modem 3750 such as a baseband chipset, which are electrically coupled to a system bus 3760. In the case where the computing system 3700 is a mobile device, a battery (not shown) for supplying the operating voltage of the computing system 3700 may be additionally provided. Although not shown in the drawing, it is understood that the computing system 3700 may be additionally provided with an application chipset, a camera image processor (CIS), a mobile DRAM, and other components. The memory system 3710 may configure, for example, an SSD (solid state drive/disk) which uses a nonvolatile memory to store data. Otherwise, the memory system 3710 may be provided as a fusion flash memory (for example, a one NAND flash memory).

In the description above, terms such as "include," "comprise" and "have" are inclusive or open rather than exclusive or closed unless expressly defined to the contrary. All technical and scientific terms are intended to have meanings as understood by a person skilled in the art unless defined to the contrary. Common terms as found in dictionaries should be interpreted in the context of related technical writings and the present disclosure unless the present disclosure expressly defines them differently.

While various embodiments have been described above, it will be understood by those skilled in the art in light of the present disclosure that various modifications may be made. Accordingly, the present invention including the memory device including page buffers described herein is not limited to the described embodiments. Rather, the present invention encompasses all such modifications that fall within the scope of the claims.

What is claimed is:

1. A memory device comprising:
a plurality of bit lines;
a page buffer circuit including a plurality of page buffers which are electrically coupled to the plurality of bit lines; and
a cache circuit including a plurality of caches which are electrically coupled to the plurality of page buffers,
wherein a number of stages of the page buffer circuit is less than a number of stages of the cache circuit.

2. The memory device according to claim 1, wherein each of the page buffer circuit and the cache circuit comprises two groups.

3. The memory device according to claim 2, wherein each of the two-page buffer groups comprises an odd number of stages.

4. The memory device according to claim 2, wherein a number of stages of each of the two-page buffer groups is less than a number of data input/output pins, and a number of stages of each of the two cache groups is the same as the number of data input/output pins.

5. The memory device according to claim 2, wherein the two-page buffer groups are distinguished based on corresponding data input/output pins.

6. The memory device according to claim 2, wherein the two-page buffer groups are distinguished based on whether bit lines coupled thereto are odd or even.

7. The memory device according to claim 1,
wherein each of the plurality of bit lines is electrically coupled to a corresponding page buffer through a bit line contact, and
wherein bit line contacts are disposed such that bit lines of one bit line input/output unit are arranged adjacently.

8. The memory device according to claim 7, wherein bit line contacts are disposed such that at least two-bit lines, respectively coupled to two-page buffers which are adjacent in a bit line direction, are not adjacent to each other.

9. The memory device according to claim 7, wherein bit line contacts in the same stage of the page buffer circuit are disposed so as not to be adjacent to one another.

10. The memory device according to claim 1, wherein page buffers of one page buffer input/output unit in the page buffer circuit are disposed over at least two columns.

11. The memory device according to claim 10, wherein page buffers of one page buffer input/output unit transmit data to corresponding caches while sharing a page line.

12. The memory device according to claim 11, wherein, among the page buffers of one page buffer input/output unit, page buffers positioned in a column where the page line is not disposed are coupled to the page line via adjacent page buffers through page coupling lines.

13. The memory device according to claim 12, wherein the page coupling lines are formed in a semiconductor layer or a gate layer of internal circuits of the page buffers.

14. The memory device according to claim 1, wherein even page buffers and odd page buffers are disposed together in each of the stages of the page buffer circuit.

15. A memory device comprising:
a plurality of bit lines; and
a page buffer circuit in which a plurality of page buffers electrically coupled to the plurality of bit lines are arranged in a matrix,
wherein the plurality of page buffers are grouped into a plurality of page buffer input/output units in correspondence to a data input/output processing unit,
wherein page buffers of one page buffer input/output unit are disposed over at least two columns,
wherein page buffers of one page buffer input/output unit transmit data to corresponding caches while sharing a page line, and wherein, among the page buffers of one page buffer input/output unit, page buffers positioned in a column where the page line is not disposed are coupled to the page line via adjacent page buffers through page coupling lines.

16. A memory device comprising:

a plurality of bit lines; and a page buffer circuit including a plurality of page buffers which are electrically coupled to the plurality of bit lines, wherein the page buffer circuit is divided into a first page buffer group and a second page buffer group depending on corresponding data input/output pins, and wherein each of the first page buffer group and the second page buffer group has an odd number of stages, the number of the stages being a number of page buffers arranged along an extending direction of the bit lines.

17. The memory device according to claim 16, wherein even page buffers and odd page buffers are disposed together in at least one stage of the page buffer circuit.

18. The memory device according to claim 17, wherein, in the page buffer circuit, the plurality of page buffers are arranged in a matrix, and even page buffers and odd page buffers are alternately disposed in rows and columns.

19. A memory device comprising:

first and second arrays of page buffers coupled to bit lines; and first and second arrays of caches electrically coupled to the first and second arrays of page buffers, respectively, and electrically coupled to first and second data pin groups, respectively, wherein a row size of each array of page buffers is smaller than a row size of each array of caches.

* * * * *